(12) United States Patent
Robbins et al.

(10) Patent No.: US 7,327,349 B2
(45) Date of Patent: Feb. 5, 2008

(54) ADVANCED NAVIGATION TECHNIQUES FOR PORTABLE DEVICES

(75) Inventors: Daniel C. Robbins, Seattle, WA (US); Raman K. Sarin, Redmond, WA (US); Eric J. Horvitz, Kirkland, WA (US); Edward B. Cutrell, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 696 days.

(21) Appl. No.: 10/791,232

(22) Filed: Mar. 2, 2004

(65) Prior Publication Data

US 2005/0195154 A1    Sep. 8, 2005

(51) Int. Cl.
*G09G 5/00*    (2006.01)

(52) U.S. Cl. .............. 345/156; 345/159; 345/179; 345/428; 345/661; 345/688; 715/788; 715/789; 715/800

(58) Field of Classification Search ............... 345/156, 345/157, 179, 661, 662, 688, 428
See application file for complete search history.

(56) References Cited

U.S. PATENT DOCUMENTS

| | | | |
|---|---|---|---|
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,812,865 A | 9/1998 | Theimer et al. | |
| 5,973,697 A | 10/1999 | Berry et al. | |
| 6,262,741 B1 * | 7/2001 | Davies | 345/423 |
| 6,388,684 B1 * | 5/2002 | Iwamura et al. | 715/788 |
| 6,466,232 B1 | 10/2002 | Newell et al. | |
| 6,513,046 B1 | 1/2003 | Abbott, III et al. | |
| 6,549,915 B2 | 4/2003 | Abbott, III et al. | |
| 6,590,593 B1 | 7/2003 | Robertson et al. | |
| 6,704,034 B1 * | 3/2004 | Rodriguez et al. | 715/860 |

(Continued)

FOREIGN PATENT DOCUMENTS

WO    9800787    1/1998

OTHER PUBLICATIONS

Daniel C. Robbins, et al., ZoneZoom: Map Navigation for Smartphones with Recursive View Segmentation, AVI 2004, May 25-28, 2004, 4 pages, Gallipoli, Italy.

(Continued)

*Primary Examiner*—Richard Hjerpe
*Assistant Examiner*—Jennifer T Nguyen
(74) *Attorney, Agent, or Firm*—Amin, Turocy & Calvin, LLP

(57) ABSTRACT

The present invention provides a unique system and method that facilitates navigating smoothly and gracefully through any type of content viewable on portable devices such as cell-phones, PDAs, and/or any other hybrids thereof. In addition, such navigation can be performed while preserving perspective and context with respect to a larger amount of content. Pointing devices can also be used to navigate through content—the amount or detail of the content being dependant on the speed of the pointing device. Additionally, a semi-transparent overview of content can be overlaid a zoomed-in portion of content to provide perspective to the zoomed in portion. Content shown in the semi-transparent overview can depend on the location of the pointing device with respect to the content.

24 Claims, 31 Drawing Sheets

U.S. PATENT DOCUMENTS

| | | | |
|---|---|---|---|
| 6,747,675 | B1 | 6/2004 | Abbott et al. |
| 6,747,680 | B1* | 6/2004 | Igarashi et al. ............. 715/784 |
| 6,768,497 | B2* | 7/2004 | Baar et al. .................. 345/661 |
| 6,791,580 | B1 | 9/2004 | Abbott et al. |
| 6,801,223 | B1 | 10/2004 | Abbott et al. |
| 6,812,937 | B1 | 11/2004 | Abbott et al. |
| 6,842,877 | B2 | 1/2005 | Robarts et al. |
| 6,956,590 | B1* | 10/2005 | Barton et al. ............... 345/684 |
| 7,089,507 | B2* | 8/2006 | Lection et al. .............. 715/855 |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0032689 | A1 | 3/2002 | Abbott, III et al. |
| 2002/0044152 | A1 | 4/2002 | Abbott, III et al. |
| 2002/0047870 | A1 | 4/2002 | Carro |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2003/0046401 | A1 | 3/2003 | Abbott et al. |
| 2003/0154476 | A1 | 8/2003 | Abbott, III et al. |
| 2005/0034078 | A1 | 2/2005 | Abbott et al. |

OTHER PUBLICATIONS

Yu Chen, et al., Detecting Web Page Structure for Adaptive Viewing on Small Form Factor Devices, WWW 2003, May 20-24, 2003, pp. 225-233, Budapest, Hungary.

Patrick Baudisch, et al., Keeping Things in Context: A Comparative Evaluation of Focus Plus Context Screens, Overviews, and Zooming, CHI 2002, Apr. 20-25, 2002, 8 pages, Minneapolis, Minnesota, USA.

Patrick Baudisch, et al., Focus Plus Context Screens: Display for Users Working with Large Visual Documents, CHI 2002, Apr. 20-25, 2002, 2 pages, Minneapolis, Minnesota, USA.

Tomonari Kamba, et al., Using small screen space more efficiently, CHI 96, Apr. 13-18, 1996, 8 pages, Vancouver, British Columbia, Canada.

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In the 4th International Conference on Distributed Computing Systems, Jun. 1994. pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, pp. 94-104, vol 265—No. 3.

P. Baudisch and R. Rosenholtz. Halo: A Technique for Visualizing Off-Screen Locations. In Proc. CHI '03, pp. 481-488, 2003.

B.B. Bederson, et al. A Fisheye Calendar Interface for PDAs: Providing Overviews for Small Displays. In "The Craft of Information Visualization: Readings and Reflections," pp. 324-344, Morgan Kaufman. Inc. 2003.

B. Bederson, et al. Pad++: A Zomable Graphical Sketchpad for Exploring Alternate Interface Physics. Journal of Visual Languages and Computing, vol. 7, pp. 3-31, 1996.

S. Bjork, et al. WEST: A Web Browser for Small Terminals. In Proc. UIST '99, pp. 187-196, 1999.

O. Buyukkokten, et al. Power Browser: Efficient Web Browsing for PDAs. In Proc. CHI '00, pp. 16-23, 2000.

G.W. Furnas. Generalized Fisheye Views. In Proc. CHI '86, pp. 16-23, 1986.

K. Hinckley, et al. Input/Output Devices and Interaction Techniques: In CRC Computer Science and Engineering Handbook. A.B. Tucker, ed. CRC Press LLC: Boca Raton, FL. 2003. 79 pages.

L.E. Holmquist and C. Ahlberg. Flip-zooming: A Practical Focus+Context Approach to Visualizing Large Information Sets. In Proc. HCI International '97, pp. 763-766, 1997.

K. Hornbaek, et al. Navigation Patterns and Usability of Zoomable User Interfaces with and without and Overview. ACM Transactions on Computer-Human Interaction, vol. 9 Issue 4, pp. 362-389, 2002.

S. Jul and G.W. Furnas. Critical Zones in Desert Fog: aids to multiscale navigation. In Proc. UIST '98, pp. 97-106, 1997.

J. Mackinaly. City Lights: Contextual Views in Minimal Space. In CHI '03 Extended Abstracts, pp. 838-839, 2003.

Microsoft Flight Simulator 2004. Microsoft Corporation. http://www.microsoft.com/games/flightsimulator/ Last Viewed on Jul. 25, 2004. 2 pages.

MSN Traffic Reports. Microsoft Corporation. http://autos.msn.com/everyday/trafficreport.aspx Last Viewed on Jul. 25, 2004. 2 pages.

J. Rekimoto. Tilting Operations for Small Screen Interfaces. In Proc. UIST '96, pp. 167-168, 1996.

A. Treisman. Preattentive Processing in Vision. Computer Vision, Graphics, and Image Processing Proceedings, vol. 31 No. 2, pp. 156-177, 1985.

J. Trevor, et al. From Desktop to Phonetop: A UI for Web Interaction on Very Small Devices. In Proc. UIST '01, pp. 121-130, 2001.

J. Van Wijk, et al. A Smooth and Efficient Zooming and Panning. In Proc. INFOVIS '03, pp. 15-22, 2003.

Washington Department of Transportation Traffic Maps, http://www.wsdot.wa.gov/PugetSoundTraffic/ Last Viewed on Jul. 25, 2004. 2 pages.

Hesham M. Kamel, et al., The Use of Labeling to Communicate Detailed Graphics in a Non-visual Environment, PowerPoint presentation, University of California, Berkeley, Chi 2001.

Hesham M. Kamel, et al., Constructing Images Eyes-free: A Grid-based Dynamic Drawing Tool for the Blind, PowerPoint Presentation, University of California, Berkeley, Assets 2002.

Hesham M. Kamel, et al., IC2D: A Drawing Program for the Visually Imparied, PowerPoint presentation, University of California, Berkeley, Chi 99.

Hesham M. Kamel, et al., A Study of Blind Drawing Practice: Creating Graphical Information Without the Visual Channel, PowerPoint presentaion, University of California Berkeley, Assets 2000.

Pook, et al. "Context and Interaction in Zoomable User Interfaces", AVI 2000 Conference Proceedings, May 24-26, 2000, pp. 227-231 & 317, Palermo, Italy.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 pages.

Robert M. Losee, Jr. Minimizing information overload: the ranking of electronic messages, Journal of Information Science 15, Elsevier Science Publishers B.V., 1989, pp. 179-189.

\* cited by examiner

VIEW ZOOMS OUT DURING PAN FROM ONE SIBLING VIEW (SECTOR 4) TO ANOTHER (SECTOR 6)

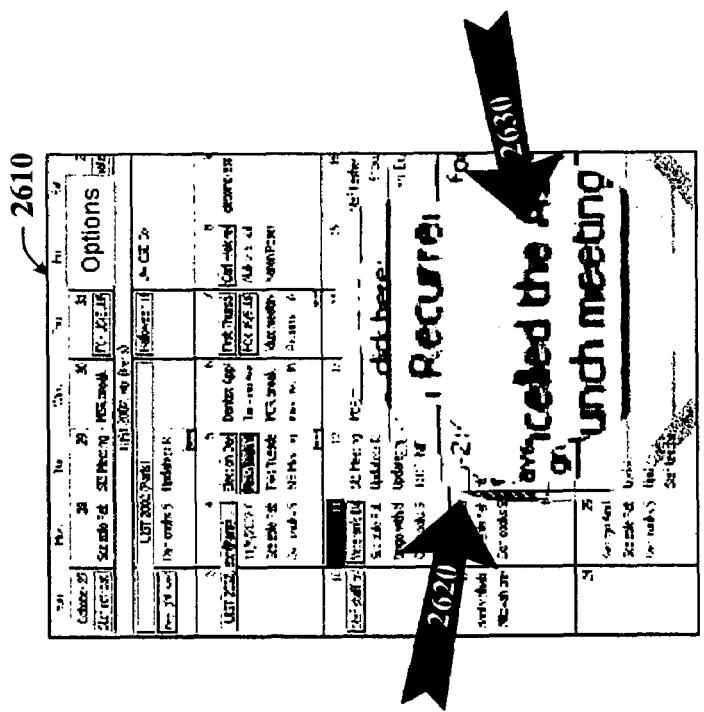
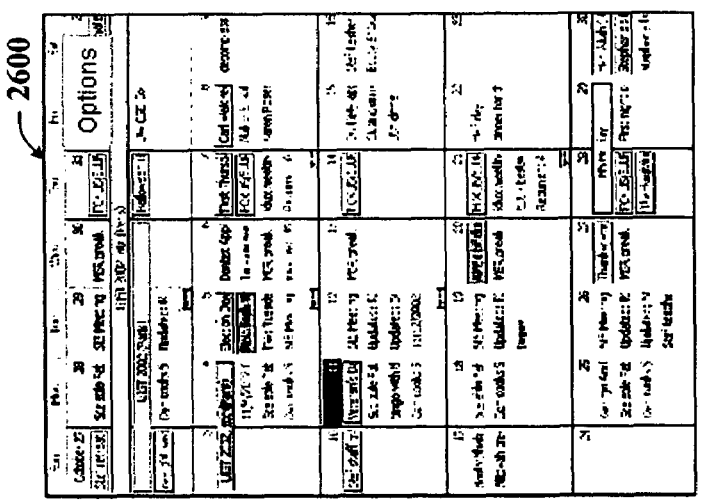
FIG. 26

FIG. 27

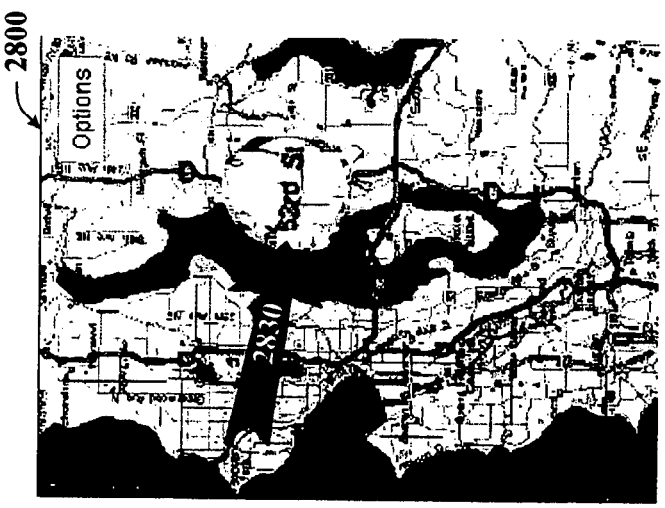
FIG. 28

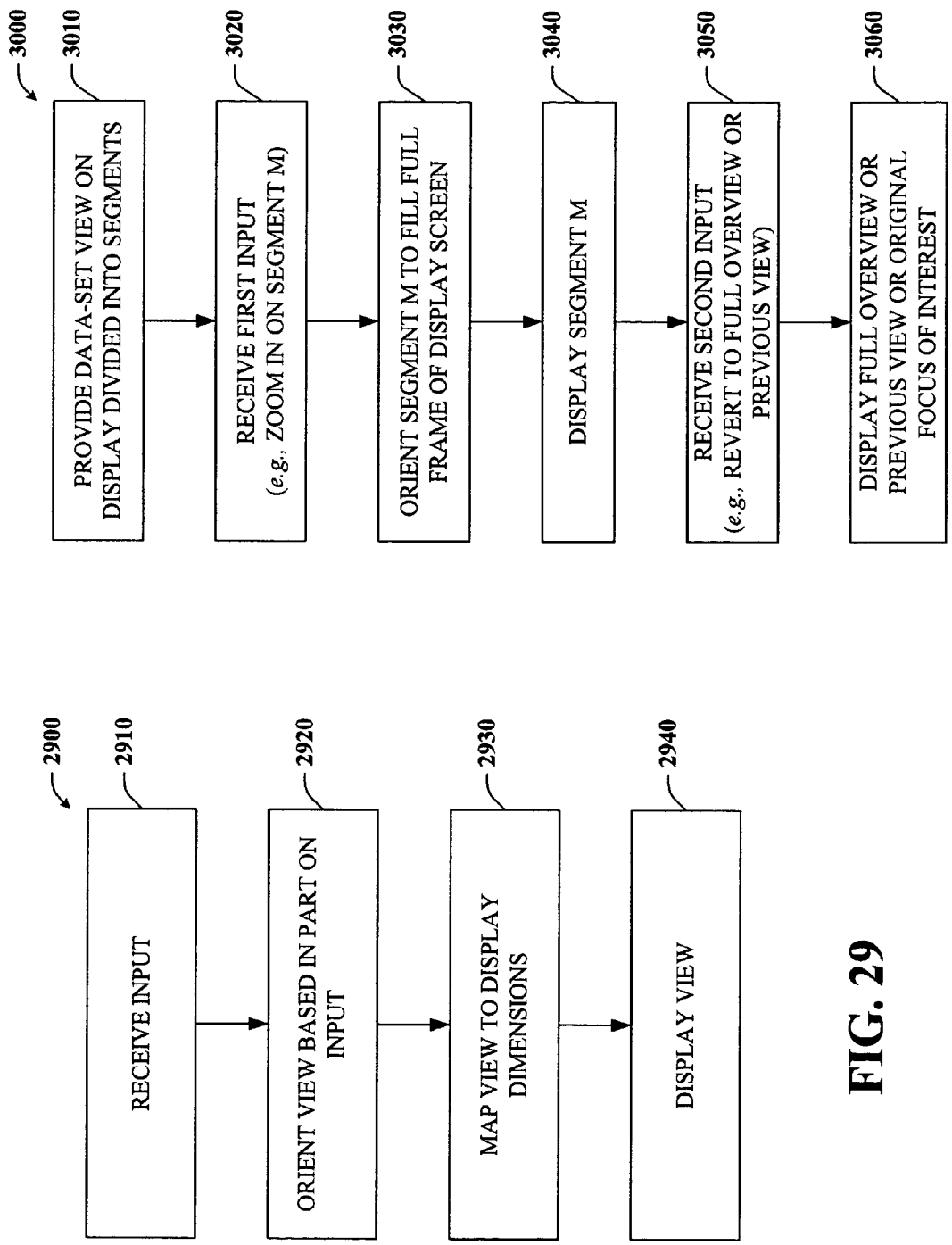

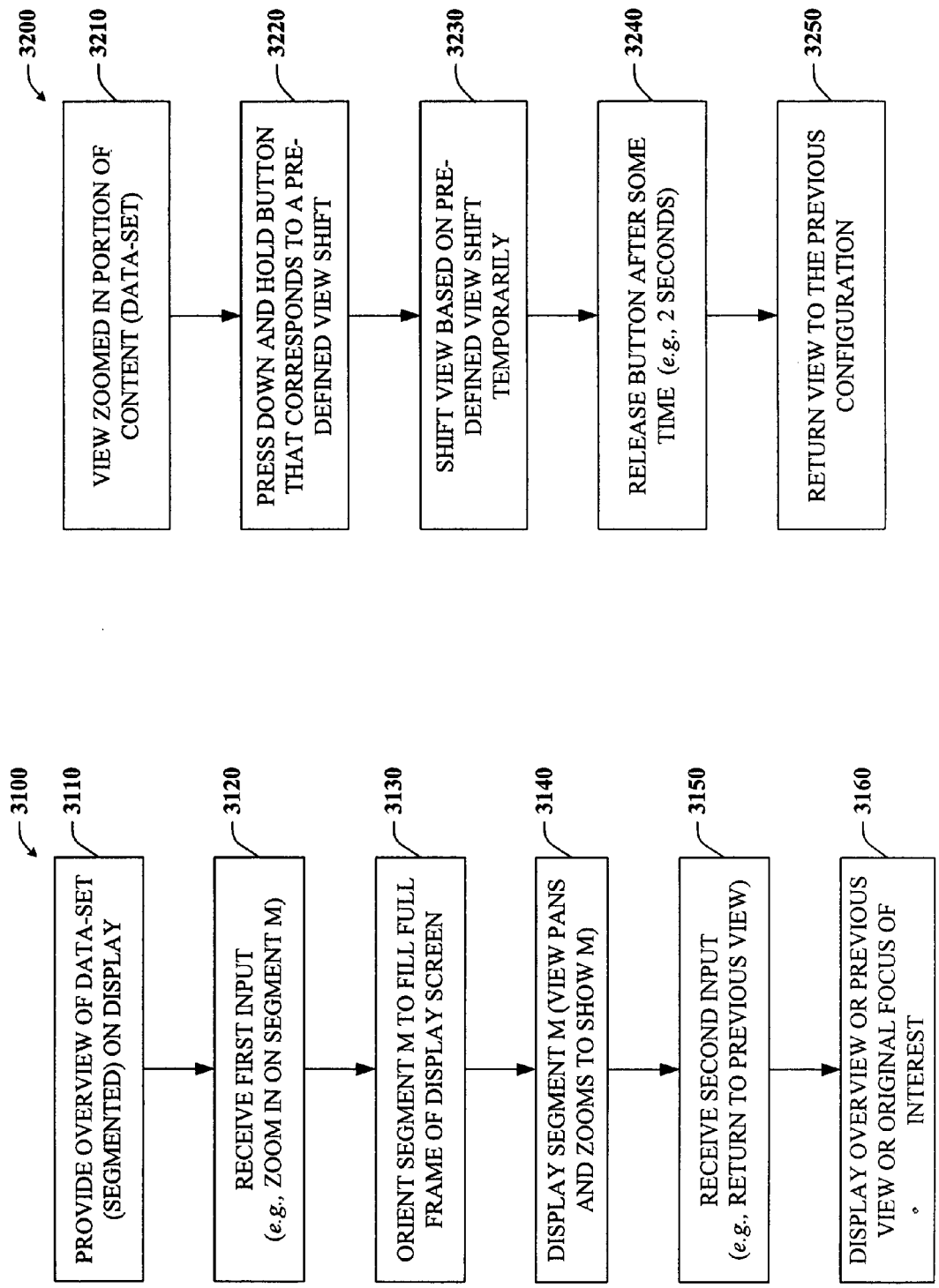

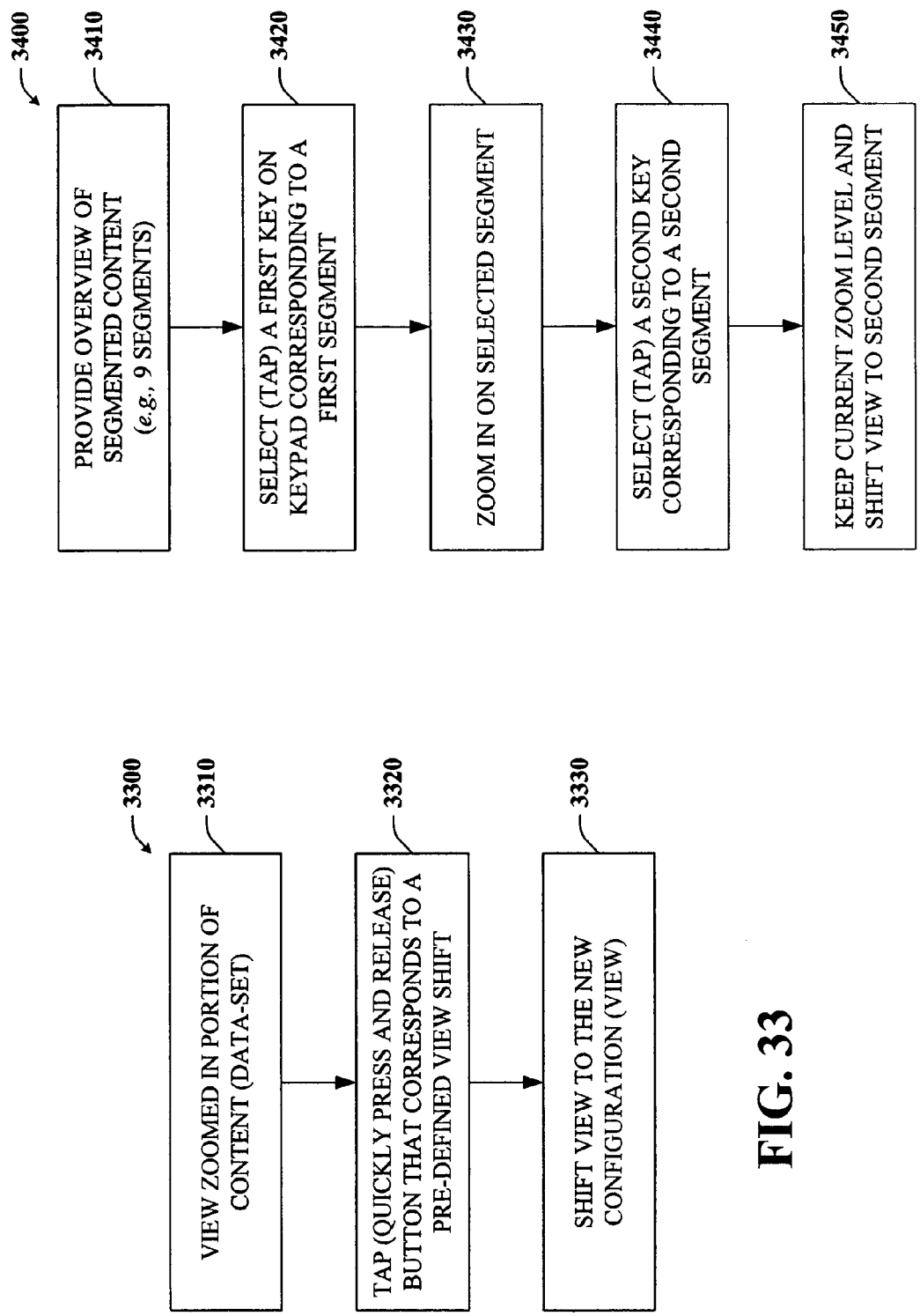

ADVANCED NAVIGATION TECHNIQUES FOR PORTABLE DEVICES

TECHNICAL FIELD

The present invention relates generally to navigating in a two-dimensional space and in particular, to navigating through a data-set at multiple levels of magnification in either a mobile or non-mobile environment.

BACKGROUND OF THE INVENTION

Interest in creating rich user experiences on small portable devices has grown in parallel with the proliferation of PDAs and cell-phones built on mature computing platforms. The growth of the computational power of these devices has continued against the relatively constant display and navigation bottlenecks they pose to users. Small portable computing devices provide only provide a limited view of a given information space. The limited input modalities make it difficult for small form-factor devices to support both incremental and ballistic (rapid navigation towards a target typically initiated by a command or button press) navigation of large datasets. Because these devices are often used in mobile situations where user's attention is divided, interactions that require precise control are challenging.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a system and/or methodology that facilitate navigating and/or browsing large information spaces on relatively small portable devices such as portable phones, PDAs and the like, for example. In particular, the system and method allow navigation of multi-resolution graphical content at multiple levels of magnification. As a result, a user can quickly choose between a fixed number of view configurations at a given zoom level. In addition, the present invention provides the user with an ability to quickly glance at an alternative view with respect to the current view. This affords the user with an improved perspective of the current view in relation to the surrounding areas. Moreover, users can readily gain an overview of the graphical content and compare information from different spatial regions of the content.

According to an aspect of the invention, a particular view of a data-set, starting with the farthest zoomed out view, can be divided into a set number (e.g., 9 or any other number) of sub-view-segments. If there is no "farthest zoomed out view" such as with an infinitely zoomable dataset, it is the current view that can be sub-divided. When a user selects a hardware or software button that corresponds to a particular sub-view-segment, the view is zoomed (e.g., with animation) such that the sub-view-segment may now fill the display area. Following, the sub-view-segment can be divided into the same number of sub-view-segments. Further selection via pre-assigned buttons again can cause the view to zoom in or switch between particular sub-views. To zoom out to a previous level, a dedicated zoom-out or "back" button can be employed.

In another aspect of the invention, one or more of the sub-view segments can overlap to provide views that share some amount of content. Furthermore, the sub-view segments can be dynamically defined based at least in part upon a density of data at a given zoom level. In the alternative or in addition, the sub-views segments can be defined "ahead of time" by an application writer, for example, to optimize viewing non-constant density data. When utilized by individual users, such users can have the option to customize one or more sub-view segments according to their preferences.

According to yet another aspect of the invention, a pointing device can be utilized by a user to smoothly navigate through a data-set at multiple levels of magnification on portable devices. For example, the portable device can have a touch screen or some other type of display screen or touch pad that is sensitive to and/or receptive to a pointing device. When moving the pointing device faster across at least a portion of the data-set displayed on the screen, less detail and more overview of the data-set can be viewed. However, when the pointing device moves at a slower speed, more detail and less overview of the data-set can be seen. The transitions between more and less detail and/or more or less overview are fluid and smooth as opposed to conventional methods that provide abrupt zoom in and zoom out views.

Furthermore, pressing the pointing device against the screen can result in a zoom in of the data-set whereas dragging the pointing device can produce a semi-transparent overview of the data-set overlaying the zoomed-in portion. Overall, the pointing device can be employed as an absolute positioning device on a large data-set within the context of a smaller portion of the data-set.

According to still another aspect of the invention, a user can "glance" at other parts of a data-set or document while browsing through such data-set on a portable device. For example, imagine that a user indicates an area of the data-set for detailed inspection. In general, this may happen via clicking on a region, selecting the name of a region from a menu or dialog, or pressing a hardware button or function key that is assigned ahead of time to a particular region. When the user wants to quickly glance at another region, the user can instruct the application to temporarily switch the view to another region by again selecting another region via the aforementioned techniques. After a time-delay or after the user releases a hardware or software button, the view quickly and smoothly (e.g., via animation) can snap back to the previous view.

Thus, in quick succession, the user can build up a mental model of how different parts of the data-set are related by quickly "glancing" at different sections of the data-set. This can be helpful when interesting data extends beyond the currently viewed region (display screen) and when the user wants to quickly compare data from sections of the data-set that are not both viewable, in detail, at the same time.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 26 illustrates an exemplary advanced navigation process on portable devices using a lens component in accordance with an aspect of the present invention.

FIG. 27 illustrates an exemplary advanced navigation process on portable devices using a lens component in accordance with an aspect of the present invention.

FIG. 28 illustrates an exemplary advanced navigation process on portable devices using a lens component in accordance with an aspect of the present invention.

FIG. 29 is a flow diagram of an exemplary advanced navigation process in accordance with an aspect of the present invention.

FIG. 30 is a flow diagram of an exemplary advanced navigation process in accordance with an aspect of the present invention.

FIG. 31 is a flow diagram of an exemplary advanced navigation process in accordance with an aspect of the present invention.

FIG. 32 is a flow diagram of an exemplary advanced navigation process in accordance with an aspect of the present invention.

FIG. 33 is a flow diagram of an exemplary advanced navigation process in accordance with an aspect of the present invention.

FIG. 34 is a flow diagram of an exemplary advanced navigation process in accordance with an aspect of the present invention.

DETAILED DESCRIPTION OF THE INVENTION

Figure 1:
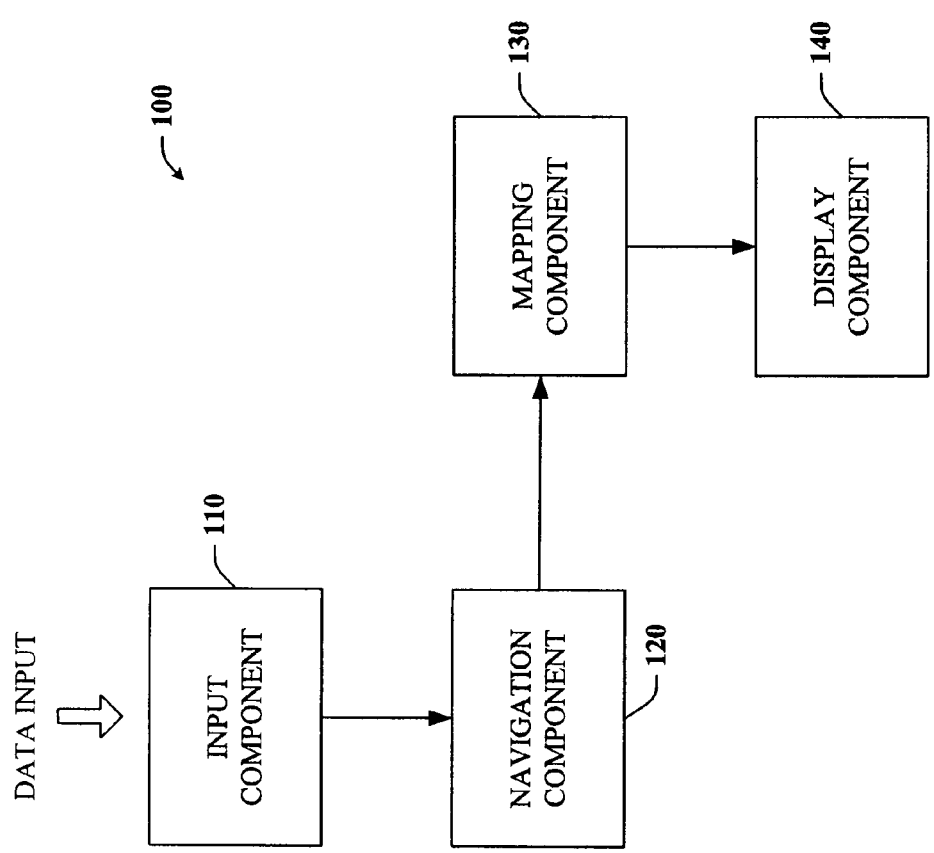
FIG. 1 is a block diagram of an advanced navigation system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The present invention is applicable to the emerging class of mobile computing devices called smartphones as well as other types of portable devices including cell-phones and PDAs. By way of example, several aspects of the invention will be discussed with relation to smartphones, however it should be appreciated that the present invention can be applied to or used in conjunction with various other portable devices.

Smartphones combine the portability and network connectivity of cell-phones with the computing power of PDAs. The color displays of smartphones are capable of animation and usually have resolutions in the range of 200 by 200 pixels. Many of these devices do not have touch screens and even those that do are often used in one-handed situations. Most smartphones augment the numeric keypad with a four-way directional keypad (d-pad) or joystick. In addition there are several dedicated buttons (back, home, and action) and two "soft-keys" that can be arbitrarily assigned functionality by the current application.

The size and layers of detail in common information spaces, such as maps, spreadsheets, and web pages, easily overwhelm the small screen of smartphones. When a user zooms in far enough to see relevant detail, it becomes tedious for the user to navigate across large distances using the d-pad of the smartphone. Additionally, when the user is zoomed in, it is difficult for the user to retain a sense of context and maintain a mental model of the information space. This invention details a combination of techniques which can adapt zoomable user interfaces (ZUIs) for small form factor mobile or portable devices.

CONVENTIONAL TECHNIQUES

Previous research for small devices has focused on three main areas: methods for dividing the information space into manageable segments, the design of interaction techniques for moving among these segments, and ways of showing context for a given sub-segment. The intent is that the content of each segment can be easily read, the navigation options for the user are simplified, and that each sub-section show related information.

Information Space Segmentation—When possible, an analysis of content is used to break up the information space based on related content or content that a user would want simultaneous access to. When that is not possible, the content can be divided in a wholly spatial manner such that any subsection is guaranteed to fit on the display screen. The WEST system allowed users to sequentially flip between web-page segments but does not allow selection of arbitrary segments. Subsequent work takes greater advantage of touch screens to allow users to choose arbitrary sub-segments for full-screen viewing.

The M-Links system breaks the information space navigation task into two modes. A user is presented with textual list of the structure and links on a web page. When a user selects an item from the list, the mode is switched to show the related content from the original web page. Although perhaps appropriate for web pages, the approach does not work for content such as maps because in maps there is no distinction between the content and the structure. The roads, landmarks, cities, and boundaries are both the content and the structure of the map. There is often structure and hierarchy present in terms of overlaid political boundaries (neighborhood, city, county, state, and etc) but merely presenting a textual nested list of locales does not aid the user when they want to compare spatial information or make distance judgments.

Zoomable User Interfaces—Zoomable user-interfaces (ZUIs) attempt to address the issue of navigating among sub-views of large or infinite information spaces. Systems such as Pad++ arrange information in space and scale and allow users to navigate by use of a combination of panning and zooming (PZ). Information is typically arranged in an infinitely pannable space and at many nested levels of detail. Different amounts of information are displayed as users change their zoom level and in implementations that use semantic zooming, information elements change their representation to intelligently display their most salient features. Users face two major issues when using ZUIs. First, it can be difficult for a user to keep track of where they are in the information space. Secondly, users can easily navigate to locations in the data-set where there is such a low density of data, that there are no navigation cues. Related to this, it can be difficult when zoomed out to even know where interesting information is. Various cues have been suggested for dealing with these issues of "desert fog".

Information Space Context—There are several strategies for providing context to users when they are viewing a detailed portion of information space. Fisheye Views provide context for navigation by compressing the area that surrounds the zoomed-in detail section into the periphery. This works well on desktop PCs and even on PDAs. The display size on a smartphone, though, is so small that peripheral regions of a common fisheye visualization would not convey any useful information without overly compromising the usefulness of the central zoomed-in region. In addition, the compression aspect inherent to a fisheye visualization may also hinder user understanding of spatial relationships between places on a map or in other geometric datasets.

Fisheye techniques can work well with web pages as it is acceptable to compress the white space or even reorder some elements. For maps, however, this kind of representation only works in a limited set of tasks. When a user wants to make judgments about travel time from geometric relationships, the "white" or sparsely populated areas can be just as important as densely filled areas. In some scenarios, such as subway maps, it is more helpful to compress white-space. Changing the spatial relationships or order between places on a map can work against user comprehension.

In contrast to ZUIs, overview+detail systems explicitly show the context for the current zoomed-in view by means of a separate overview window. There are benefits to adapting the overview view for use in ZUIs although effective visual design is even more difficult on small screen devices. The close coupling of panning and zooming works well with precision input devices such as mice and large high-resolution displays. It is cumbersome, though, to require a user to engage in precise panning when using a smartphone, especially when the user may be repeatedly navigating between a small set of locales with limited attention.

Thus, the previous approaches are limited in their respective methodologies, particularly with respect to small portable devices.

PRESENT INVENTION

One aspect of the present invention allows users to easily, quickly, and predictably utilize one hand to navigate around a detailed two-dimensional information space on any portable device such as a smartphone, for example. The figures below relate at least in part to the navigation of maps in general and the browsing of a near-real time road-traffic monitoring application in specific. However, it should be appreciated that other applications and/or objects can be viewed and/or employed and such are contemplated to fall within the scope of the invention.

The present invention will now be described with respect to FIGS. 1-38 below. Referring now to FIG. 1, there is a general block diagram of an advanced navigation system 100 designed to navigate any two-dimensional space comprising content (e.g., data-set) such as maps, documents, spreadsheets, photographs, images, and the like, for example. The navigation system 100 receives input (e.g., from a user) by way of an input component 110. Exemplary input components include a keypad, a d-pad, a touchpad, a joystick, and/or a pointing device such as a stylus, pen, or mouse, as well as any other type of communication link, channel, or network connection.

A navigation component 120 receives the input from the input component and navigates or moves at least a portion of the content based in part on the input. For example, the input can relate to some instruction or direction involving a desired manner of viewing some portion of the content. A mapping component 130 operatively coupled or connected to the navigation component 120 can orient the content into a proper view or configuration according to the navigational information communicated thereto; and the resulting view can be presented within a viewable region of a display component 140. The system 100 facilitates browsing content on smaller portable devices in part by allowing users to "view" surrounding areas of content that extend out of the viewable display region at the same time or near the same time as looking at a mere fraction of the content in greater detail (e.g., zoom in). The particular types of navigational movements and the views resulting therefrom are described in more detail below.

Figure 2:
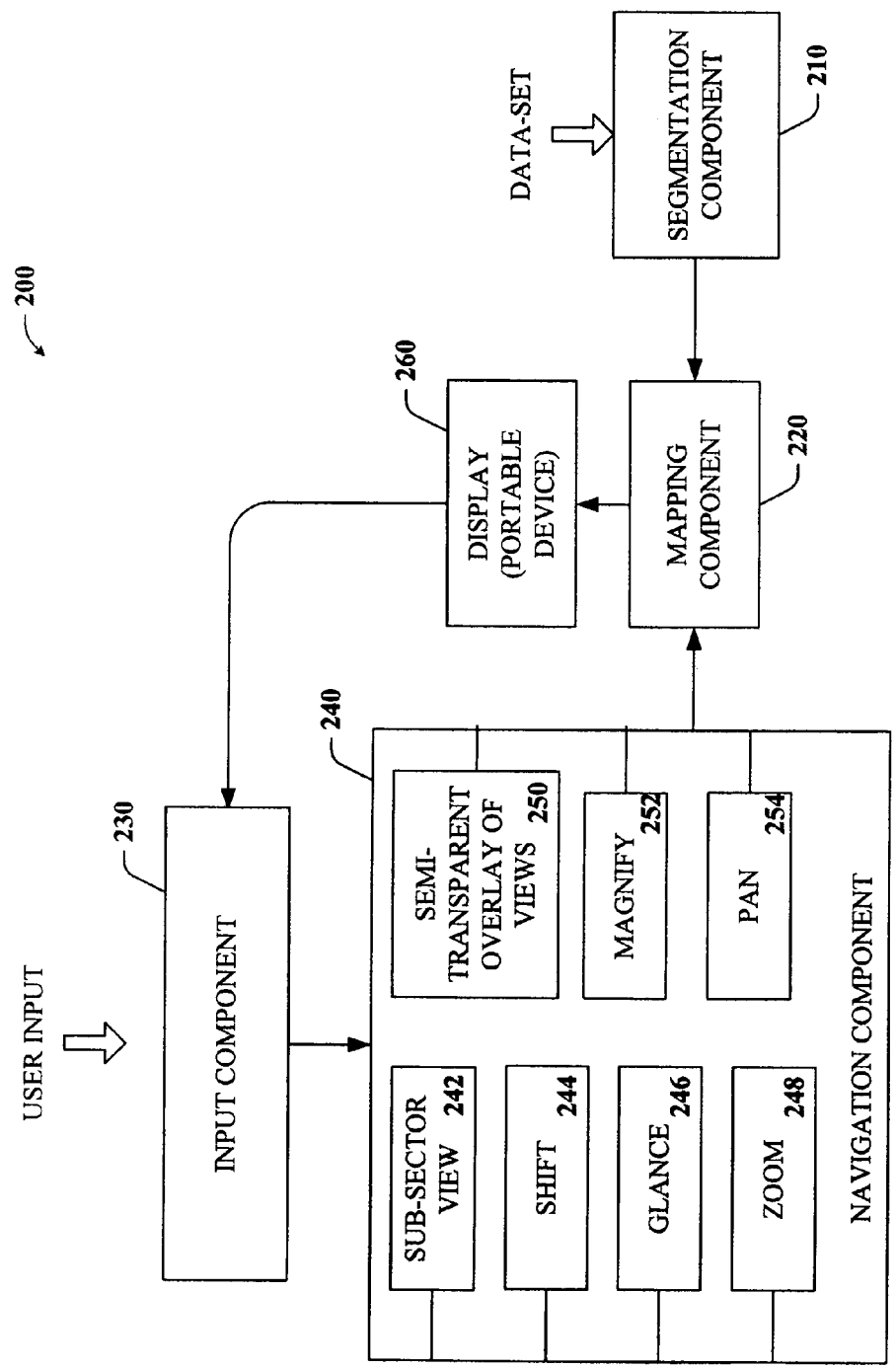
FIG. 2 is a block diagram of an advanced navigation system for viewing information presented on key-based as well as non-key-based portable devices in accordance with another aspect of the present invention.

Referring now to FIG. 2, there is illustrated a block diagram of another advanced navigation system 200 that facilitates the navigation of two-dimensional content space in portable devices. Before navigation (or browsing) can begin, content such as a data-set can be uploaded or accessed by the portable device. The content can include, but is not limited to, any type of document, such as pictures, calendars, images, spreadsheets, reports, maps, books, text, web pages, etc. as well as their related programs or applications. The data-set can be received by a segmentation component 210 which can divide the viewable content (e.g., parent view) into any number of segments, sub-sectors or child views. It should be appreciated that the viewable part of the data-set may be a fraction of a much larger amount of the data-set, the remainder of which extends beyond the viewable region of the device display screen.

For instance, imagine that the data-set comprises a photograph of the Statue of Liberty. Thus, the photograph can be shown in full view in the viewable space of a display screen (e.g., entire photograph is in the viewable space of a display) or it is also possible that only a part of the photograph can be seen at once in the viewable space. According to one approach, the segmentation component 210 can evenly divide the viewable data-set into two or more sub-sectors. Each of these sub-sectors can then be "selected" by the user for a more detailed view of that particular sub-sector of content. The selected sub-sector can be dynamically divided into further sub-sectors for even more detailed viewing. Each "more-detailed" view of the data-set represents a child view of the original view or focus of interest. Hence, multiple viewing levels may be available depending on the content and/or the user. Segmentation can be pre-authored manually or by some other suitable system, can occur dynamically, and/or can be optimized based in part on the underlying content. This information can be communicated to a mapping component 220 that orients the content to be viewed.

In another approach, the segments can be divided into two or more overlapping and/or non-overlapping sub-sectors. Regardless of the segmentation approach employed, the sub-sectors of content can correspond to one or more input components 230. The input component 230 receives input from a user relating to viewing and/or moving through the content and/or the sub-sectors of content. The input component 230 can be any one of a touchpad, keypad, pointing device, stylus, joystick, or d-pad.

User input can be communicated to a navigation component 240 which processes and/or performs according to the input. For example, imagine that the input component comprises 9 keys such as the numbered keys on a keypad as well as the remaining 3 keys in the bottom row (e.g., "0", #, and *). The numbered keys (1-9) can be utilized to select a sub-sector of content whereas the remaining 3 keys can be employed for other types of actions related to navigating through the content such as "back", "full", and/or "zoom". According to this example, the full view (overview) of the Statute of Liberty can be divided into 9 sub-sectors to correspond directly to the 9 number keys.

Thus, when a user presses the "1" key, the corresponding "1" sub-sector is selected or highlighted for alternative viewing. In particular, the navigation component 240 can move or transition between sub-sectors 242, can shift the current view in any desired direction to reveal surrounding or neighboring content 244, can glance to another view 246, can zoom in or out of a particular view 248, can provide a semi-transparent overlay of at least two different views when navigating through content 250, can magnify a portion of the content 252, and/or can pan across the content 254. Moreover, these actions can be carried out via animation thereby resulting in smooth, fluid transitions between or among different views.

Once the mode of navigation has been communicated to and/or processed by the navigation component 240, the mapping component 220 can configure and/or manipulate the desired portion of the content based at least in part upon the segmentation information (from the segmentation component 210) for presentation on a display 260. The current view of the portion of the content can be further manipulated by additional user input received by the input component 230.

FIGS. 3-36 demonstrate various aspects of the navigation system in conjunction with navigating or browsing through a variety of content as discussed in FIGS. 1 and 2, supra. Recall that there is typically no direct pointing device on a smartphone (such as a stylus or mouse); thus, there is no way for a user to directly specify an exact location on a map. ZUIs typically separate view specification into two interactions: panning and zooming. This can be done on a smartphone, for example, by using the d-pad and dedicated zoom-in and zoom-out keys. However, the problem is that this kind of fine-grained interaction requires a high degree of attention on the part of the user—and attention is a scarce resource in mobile situations. Moreover, another aspect of the present invention augments the fine-grained interactions of the d-pad based navigation and essentially combines the interactions of panning and zooming into one cognitive cluster or operation.

Figure 3:
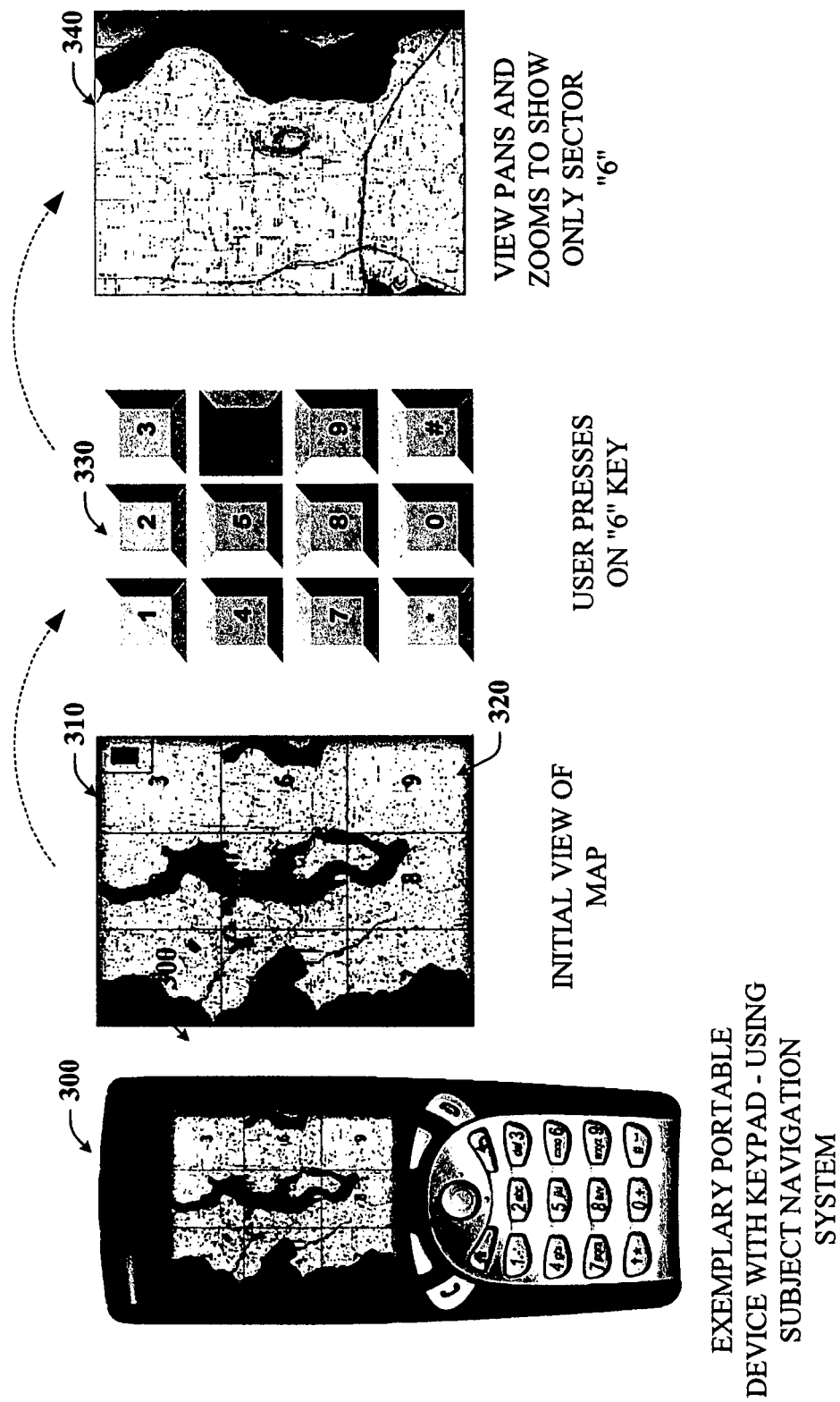
FIG. 3 illustrates an exemplary key-based advanced navigation system in use in connection with a portable device in accordance with an aspect of the present invention.
Figure 4:
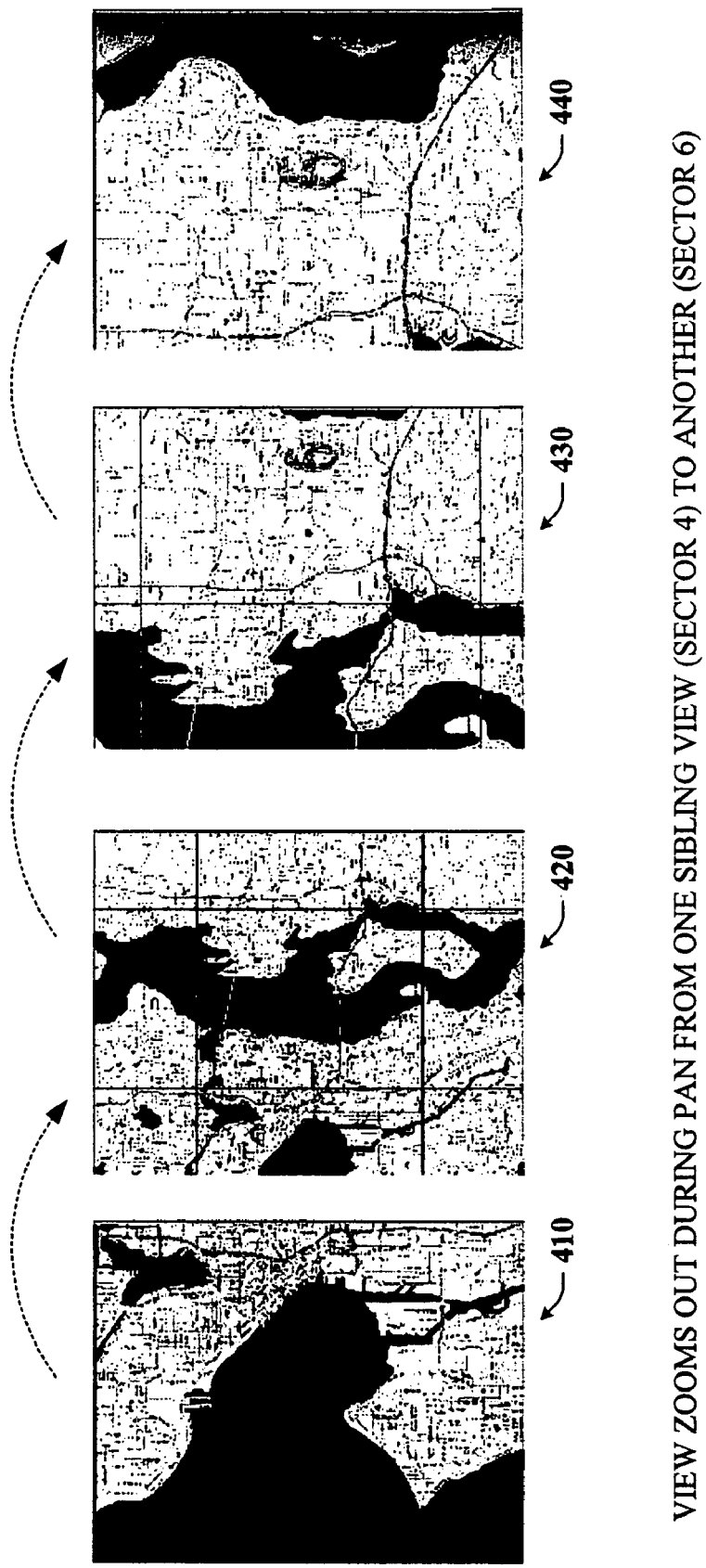
FIG. 4 illustrates a schematic navigation sequence on an exemplary portable device in accordance with still another aspect of the present invention—showing how the view pulls back during the animation to further show context

Referring now to FIGS. 3-6, there are illustrated exemplary images of a navigation system being employed to navigate a map on an exemplary portable device 300, such as a smartphone for example, in accordance with an aspect of the present invention. In FIG. 3, an initial or given view of a map 310 at a particular zoom level can be evenly divided into a set number of sub-sectors or child views 320. For a smartphone, the natural number of sub-sectors is nine, since this number maps to the number of buttons (e.g., 1-9) on the number pad. As shown, a set of outlined boxes with a numeric cue is superimposed to indicate how the current view is segmented into child views. A user can then choose to zoom in to one of these sub-sectors by pressing on the number key (330—pressing the "6" key as indicated by the darker shading on the "6") that corresponds to that sector of the screen. Pressing the same number key again, after the zoom-in action, can toggle the view to zoom back out to the parent view, as depicted in screen view 340.

When currently zoomed in, pressing a different number key will cause the view to gracefully shift to the appropriate sibling sector at the same zoom level. For example, in FIG. 4, a series of screen views of the map illustrate a smooth and/or animated transition by panning from sector 4 to sector 6, the sibling view of sector 4. In particular, screen view 410 shows a zoomed in view of sector or sub-sector 4. However, when panning from sub-sector 4 to sub-sector 6, the screen view zooms out (420) and then gradually zooms in (430) as sub-sector 6 is reached. When sub-sector 6 is in "full" view to the near exclusion of other sub-sectors (enlarged sub-sector 6 takes up the display space), the sub-sector 6 appears as enlarged or zoomed in according to screen view 440 (e.g., enlarged to a similar degree as the initial focus of interest: sub-sector 4). All of these view transitions (e.g., in, out, and same-level translation) are animated smoothly by using a simplified version of a pan-and-zoom algorithm.

In the previous example involving the smartphone, the d-pad is still available for refined view modification but the present invention allows a user to very quickly move over large areas of the information space. The child view selection method as described herein essentially adds large ballistic movement (rapid navigation towards a target typically initiated by a command or button press) to the short precise movement of the d-pad.

Figure 5:
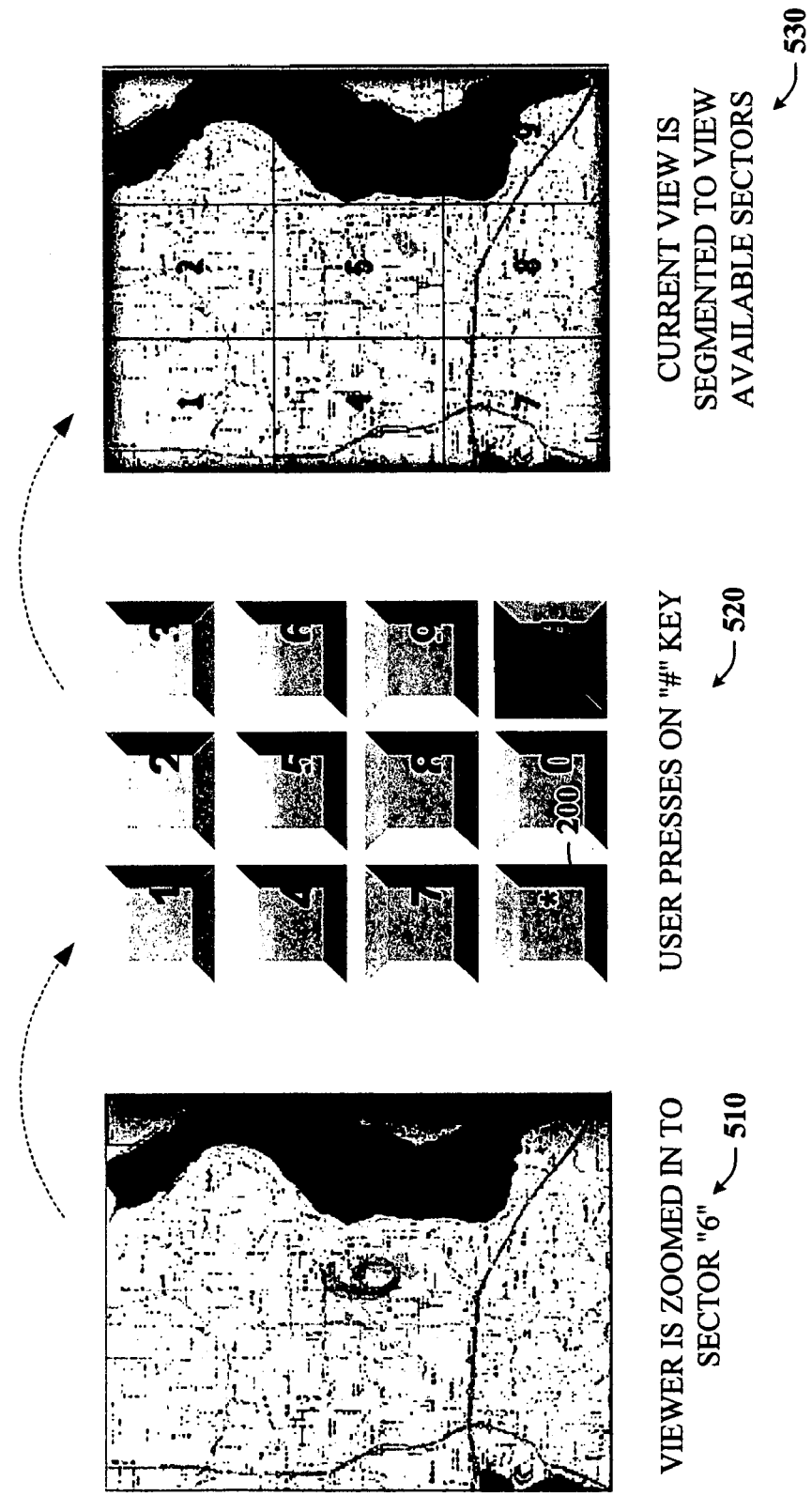
FIG. 5 illustrates a schematic navigation sequence on an exemplary portable device in accordance with an aspect of the present invention—showing how a given view can be subdivided into a number of sub-views that may correspond to hardware keys on a computing device.

This navigation technique, of zooming in and out between a parent and its child views, works well when there are only two useful levels of zoom (in and out). To extend this to arbitrary levels of zoom, we let the user display and make available the child sectors of the current zoomed-in view by pressing a dedicated "toggle children" button on the smartphone keypad (e.g., the "#" key). When the user presses this key several things can happen: nine boxes that represent how the current view is divided up are displayed and the current view is now redefined to be the parent view for these newly available children views. Subsequent number key presses predictably zoom in to the appropriate child views. FIG. 5 illustrates this concept rather clearly. In screen view 510, the display or viewer is zoomed in to sub-sector "6". When the # key is pressed (520), the current view (e.g., sub-sector 6) becomes segmented or divided into sub-sectors to view the available sectors (530). Thus, the current view of sub-sector 6 is now redefined to be a parent view and new child views are now available.

If the user is zoomed-in and wants to then zoom back out from the current view, the user can either press the number key that corresponds to the current view or press on a dedicated "zoom out" key (in our implementation, the "*" key). Pressing the zoom out key causes the view to zoom out—which results in the display of the child view boxes for the new current view. While complicated in description, this quickly becomes easy to use in practice.

Because some aspects of the present invention are adaptations of a ZUI, helping a user keep track of their location in the information space can be problematic. To address this concern, numbers can be semi-transparently superimposed on each sector to assist users in associating a particular key with the appropriate sector. Because only a small number of sub-sectors cues are shown at any time, the results on pre-attentive discrimination suggests that all of the visible sub-sectors can be processed by the user at a single glance.

When zoomed in, the current sector number can be made more transparent so that it does not obscure as much of the content. In addition, a very small and schematic overview map can be superimposed in outline form in the upper right corner of the display. A smaller rectangle (the "detail view indicator") within the overview can also indicate the relative size and location of the current view within the context of the current view's parent view. Shapes other than rectangles may be used. The shape and aspect ratio typically correspond to the shape and aspect ratio of the display on the device. [NOTE: cell phones in the future (and SPOT watches) might not have rectangular screens.]

Furthermore, a small filled rectangle (or appropriate shape) may indicate the location of the currently viewed sector relative to its parent sector. A subtle, but noticeable gradation can be applied around the entire margin of the parent sector. Thus, when zoomed in, a subsection of the gradated margin reinforces the location of the currently viewed child sector relative to its parent.

Because our technique supports arbitrary levels of zoom, the superimposed overview cue quickly becomes too small to see when its size is linearly related to the area of the current view in relationship to the entire data-set. Because of this, the current version of our overview and its embedded detail view indicator show the relationship between the current child view sector and its parent view. Design choices are quite limited for the overview cues since on current smartphones the overview only subtends approximately 20 by 30 pixels.

As with any other overlaid user interface cues, their design must provide enough contrast to be distinguishable from the background map but not so heavy weight as to unduly obscure the underling map. Subtle graphic design devices such as gradated drop-shadows are wasted or even distracting (due to naive rasterization) when rendered under the extremely limited resolution of our target hardware platform. Instead, we simply surround each cue (such as a sub-sector number) with a contrasting border and vary its level of transparency depending on the current interaction.

Figure 6:
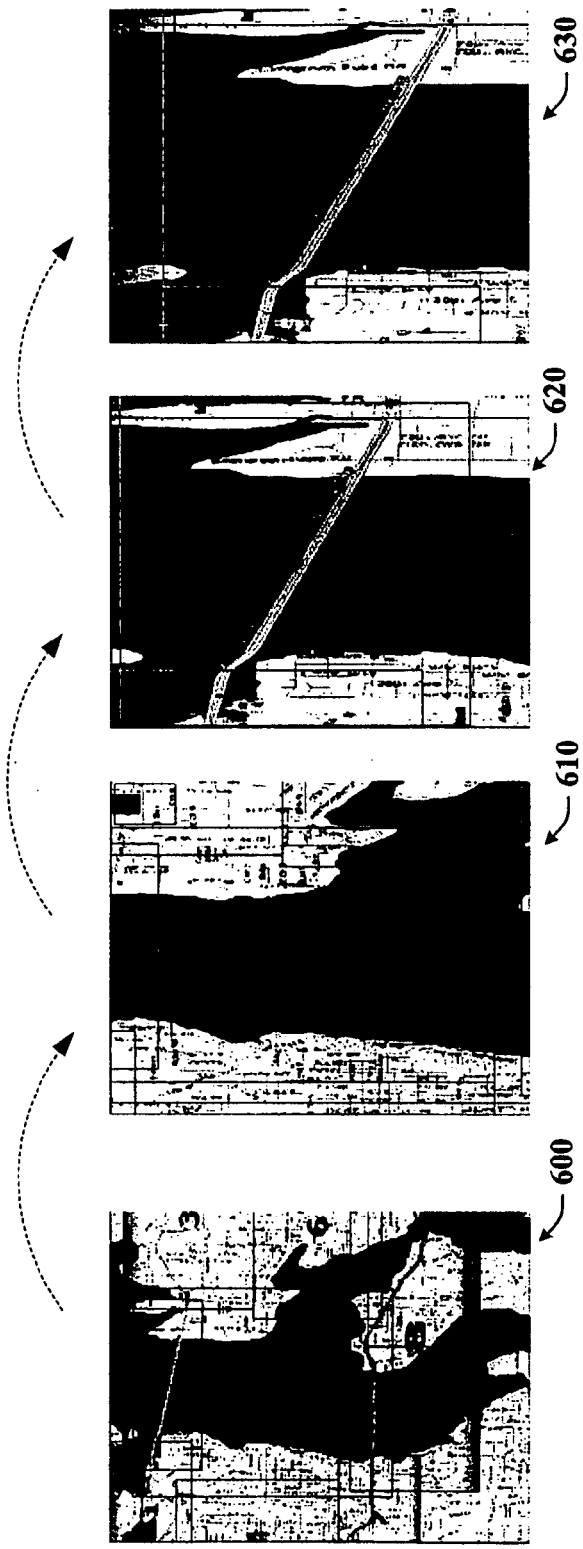
FIG. 6 illustrates a schematic navigation sequence on an exemplary portable device in accordance with an aspect of the present invention—showing how when a user selects a sub-segment whose aspect ratio differs from that of the current view, the view transition from current view to selected sub-view will incur stretching and squeezing of the view. The aspect ratio of sub-views may be optimized to show particular detail in a view.

As previously discussed, the display screen can be segmented into equal or unequal overlapping or non-overlapping segments or sub-sectors. That is, segmentation of a given screen of information need not adhere to the regular 3×3 grid. Sub-segments (also referred to as sectors, segments, or sub-sectors herein) can be rectangles with aspect ratios that differ from that of their parent or sibling views. The shapes and size of a view sector can be optimized so that when it becomes the current view, more screen space is given to more important features. Consequently, when zooming in from a parent sector of one shape to a child sector of another shape, the underlying map can appear to stretch and squeeze along its two cardinal axes as shown in FIG. 6. For example, the current view 600 can be divided into sectors optimized based at least in part upon on a number of parameters such as the content and/or author preferences. When navigating from sector 5 to sector 2 (e.g., from view 610 to view 620 to view 630), the map shrinks and stretches so that the aspect of the selected child view fills the frame or screen. It should be appreciated that these optimized child view sectors can be hand-authored. However, existing content analysis techniques could be applied to dynamically define optimized sub-views.

The glancing features of the present invention are loosely inspired by the relationship between eye-gaze and body orientation. In the physical world, the direction our body is pointing indicates our highest degree and most stable center of attention. When a user wants to gain contextual information for locomotion, he rapidly shifts his gaze around but then returns his gaze to his body's orientation. Likewise, in at least one aspect of the present invention, users can be provided with a quick means of building up contextual information about a current view.

The current static view is akin to the view seen in the physical world when eye-gaze is aligned with body orientation. To re-orient the "body" to anther view, the user taps on the number key associated with the desired new view. To "glance" momentarily in another direction (at a nearby view) the user presses-and-holds down on the appropriate number key. When the key is released, the view animates back to the previous view. This spring-loaded glancing can be extended to also work with child views of the current view. If the user is currently zoomed out, such that segment cues are shown for the current view's child segments, pressing and holding on the number key will temporarily zoom the view to the appropriate child view. Releasing that same key will then return to the parent view. This spring-loaded view shifting allows the user to quickly glance at other sections of the data-set without losing track of their preferred center of interest. Moreover, glancing also lets a user quickly compare information in nearby regions.

The series of views shown in each of FIGS. 7-10 provide exemplary illustrations of the glancing feature employed with respect to a map-based application created for a small portable device such a cell or mobile phone. Beginning with FIG. 7, a device display screen 700 and a sample data-set 710 are provided; however, only a portion 720 of the sample data-set 710 (e.g., portion A 730, B 740 or C 750) fits at one time on the display screen 700.

Figure 7:
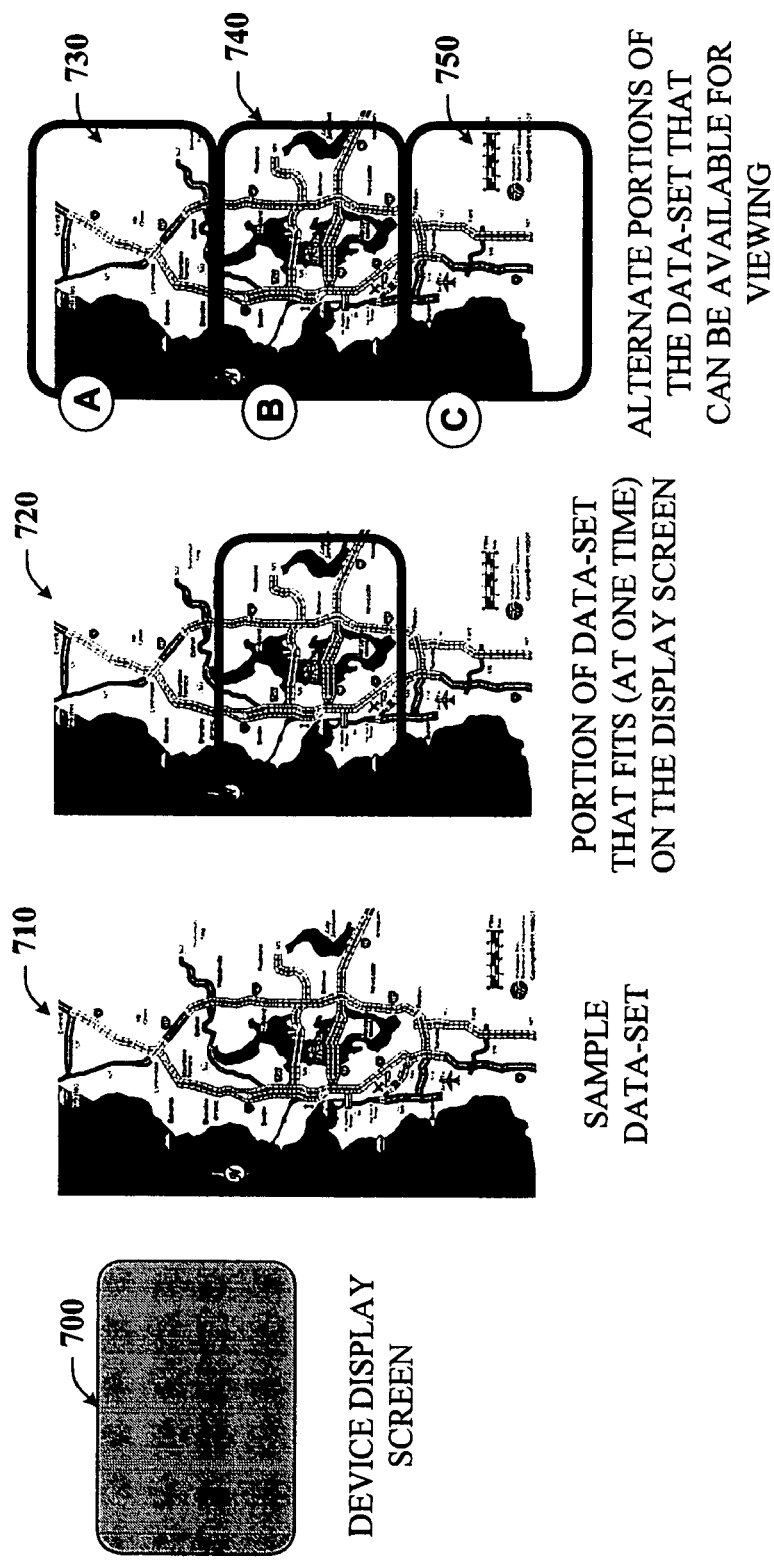
FIG. 7 illustrates a relationship between a portable device display screen, content or data-set to be viewed, as well as a portion of the data-set that can fit on the display screen in accordance with an aspect of the present invention.
Figure 8:
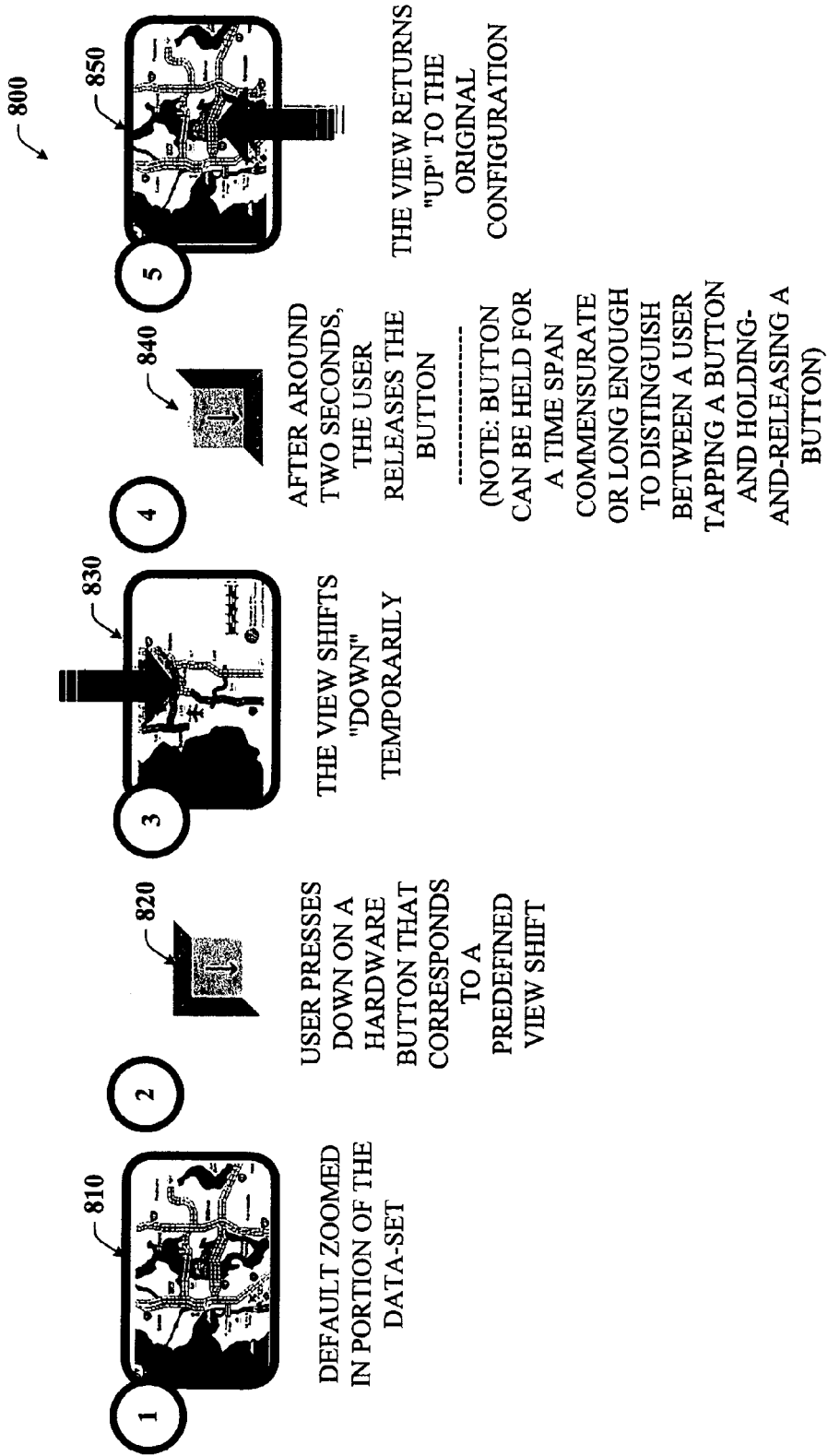
FIG. 8 illustrates an exemplary depiction of navigating through content in accordance with an aspect of the present invention.

The user may wish to zoom in to certain portions of the map so that detail such as street names may be read on the small display. FIG. 8 depicts an exemplary sequence 800 of events that occur when a user presses and holds a button that is assigned to a particular view. To zoom in to a particular region the user might select a hardware button on the device that has been previously mapped to a particular position and zoom level on the map. View 810 shows a default zoomed-in portion of the dataset 710 (FIG. 7).

Figure 9:
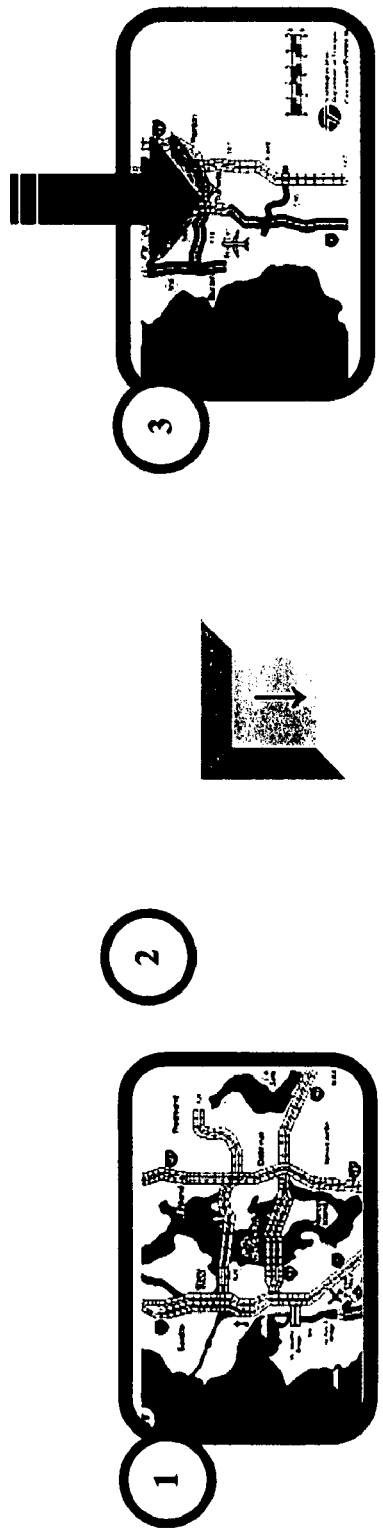
FIG. 9 illustrates an exemplary depiction of navigating through content in accordance with one specific implementation of the subject invention.

If the user merely taps another button on the keypad (820), the view is shifted to another predefined locus of interest at a predefined (or the current) zoom level (see e.g., sequence 900 in FIG. 9). If instead, the user presses-and-holds on a hardware button for a time (e.g., 2 seconds) over a (predetermined) threshold, the view is only temporarily shifted to be centered on another region (830). This allows the user to quickly glance at other sections of the dataset without losing track of their preferred view of interest. Thus, when the user releases the button (840) (e.g., after about 2 seconds), the view returns to the original or previous configuration or view (850).

Variations include reversing the time-dependent mapping. For example, tapping a hardware or software button could mean temporarily switch the view while pressing-and-holding the hardware or software button could mean shift the view in a stable manner. Moreover, the present invention includes smooth animation (linear or logarithmic) between different views.

Figure 10:
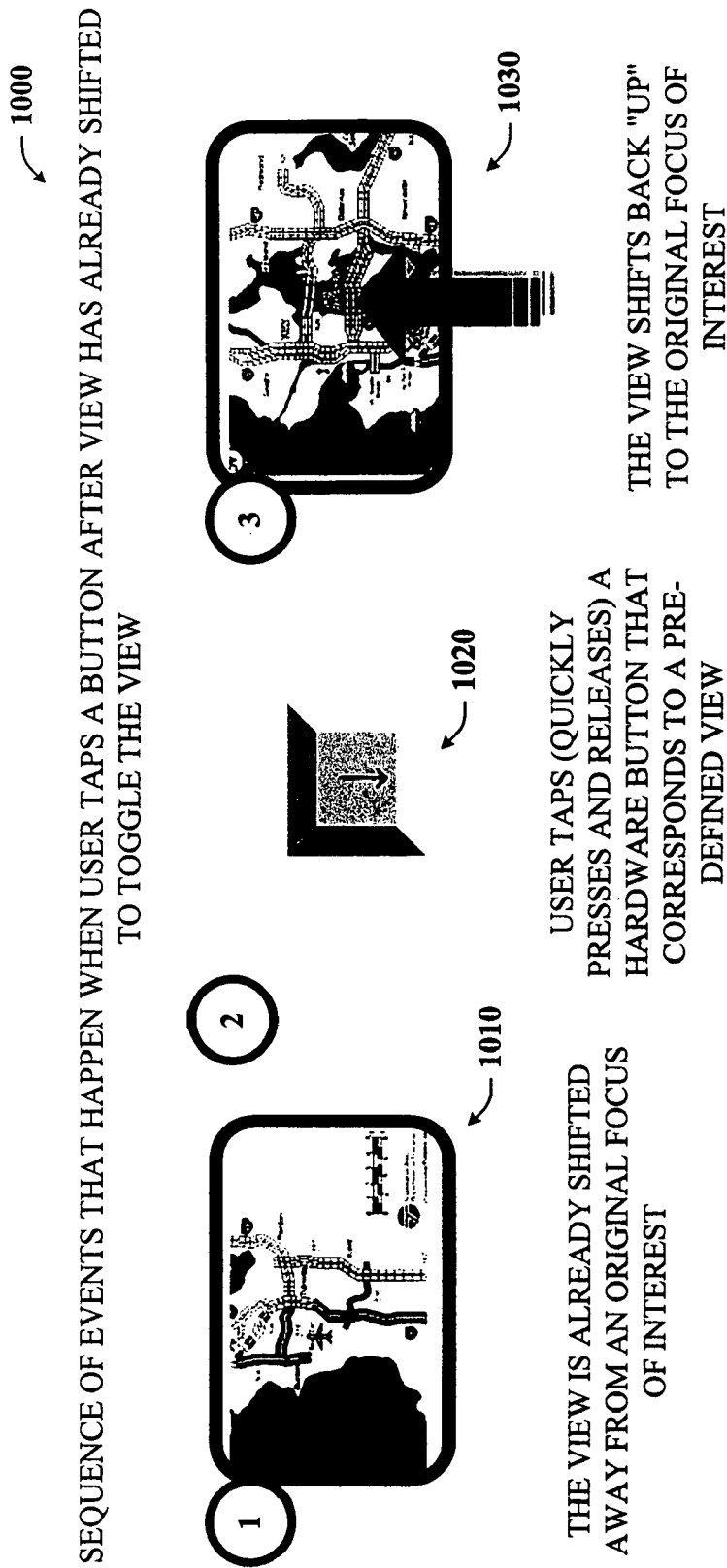
FIG. 10 illustrates an exemplary depiction of navigating through content in accordance with an aspect of the present invention.
Figure 11:
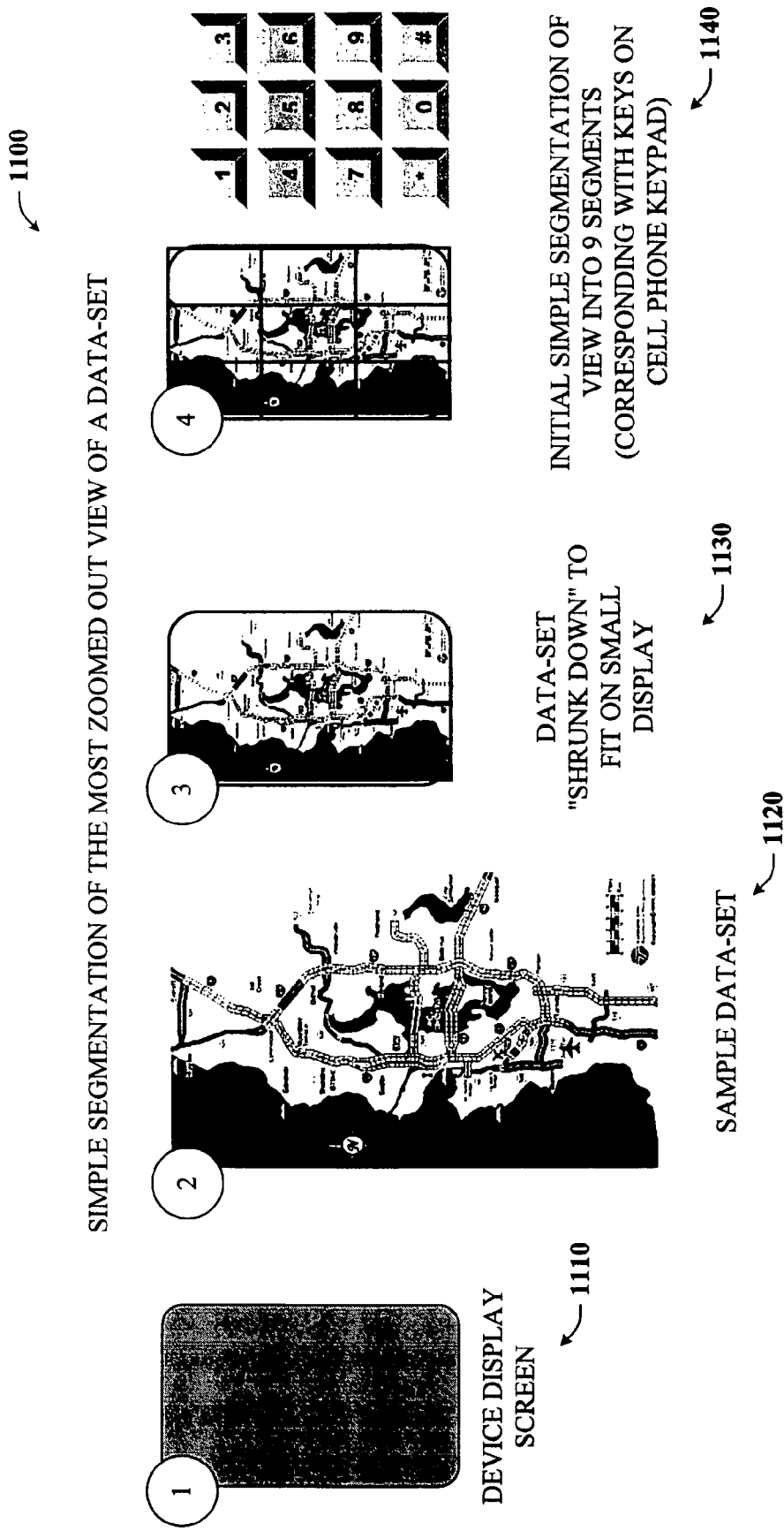
FIG. 11 illustrates an exemplary depiction of navigating through content in accordance with an aspect of the present invention.

In FIG. 10, an exemplary sequence 1000 of events that occurs when a user taps a button after the view has already shifted is illustrated. As can be seen, screen (1) 1010 indicates that the view has already shifted away from an original focus of interest. Next, a user taps (e.g., quickly presses and releases) a hardware button 1020 that corresponds to a pre-defined view. In response to the user's input (e.g., button tap), the view shifts back or returns to the original focus of interest, as shown in screen 1030. Thus, at any time and at any level of view, a user can tap on the button 1020 to return to a default or original or pre-defined view.

When combining the keypad navigational functionalities described above with a d-pad or joystick, a combination of two navigational techniques results. That is, a user can zoom in while moving incrementally over in space which results in dynamically moving around a grid of information. Hence, no matter where the user is centered with respect to the grid, the user can quickly glace at other areas nearby.

Consumer oriented flight-simulator products often have a glancing feature tied to the hardware "hat" switch on a joystick. When the user displaces the spring-loaded hat switch in a particular direction, the view is temporarily shifted to another canonical view such as behind the airplane or in to the left side of the airplane. Several car-racing games also support this feature. However, unlike these conventional products, the present invention allows both momentary (spring-loaded glancing) and stable view shifting view on the same set of software of hardware buttons. These two modes are distinguished in the subject user interface via the length of time a user holds the hardware or software button.

Moving on to FIGS. 11-14, there are illustrated various series and/or sequences of events that can occur while navigating through information space in accordance with the present invention. Beginning with FIG. 11, a simple segmentation scheme 1100 of the most zoomed out view of a data-set is shown. The scheme 1100 comprises a device display screen 1110 as well as a sample data-set 1120. Screen 1130 displays the data-set 1120 which has been shrunken down to fit on the small display 1110.

Figure 12:
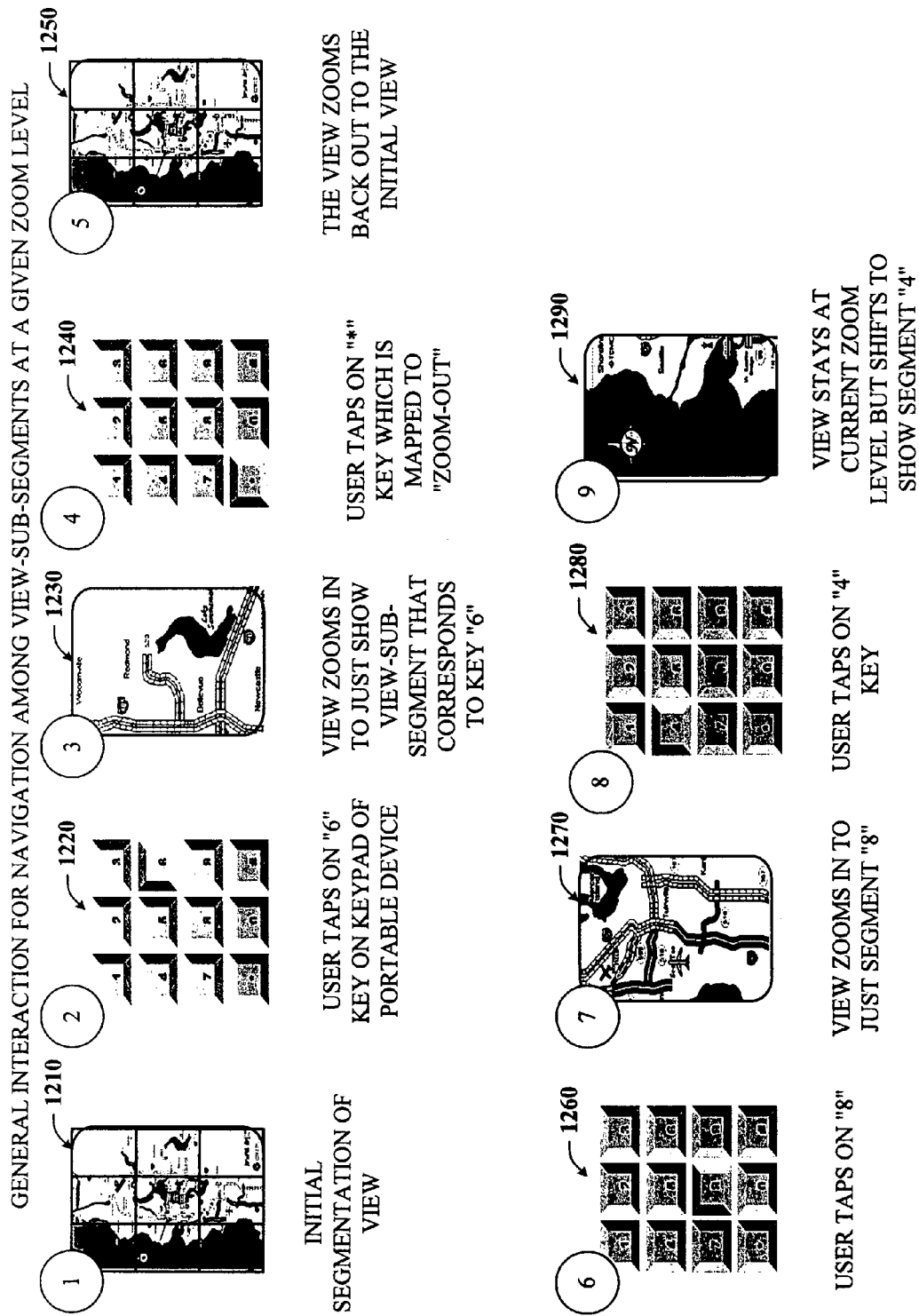
FIG. 12 illustrates an exemplary depiction of navigating through content in accordance with an aspect of the present invention.

A particular view of the data-set 1120, starting with the farthest zoomed out view (1130) is divided into a set number (such as nine) of sub-view-segments as shown in screen 1140 as well as in FIG. 12 (e.g., 1210). FIG. 12 illustrates general interaction for navigation among view sub-segments at a given zoom level. Thus, from the initial segmentation of view 1210, a user can tap on "6" key of a portable device keypad 1220. As a result, the view zooms in to just show the view-sub-segment 1230 that corresponds to the "6" key. The user taps on "*" key which is mapped to a zoomed-out functionality (1240). Thus, the view zooms back out to the initial view 1210.

From the initial view 1210, the user can tap on "8" on the keypad 1240 and the view zooms in to show segment "8" 1250 alone. Following, the user taps on "4" on the keypad 1240 and the view stays at the current zoom level but shifts to show segment "4" 1260.

Figure 13:
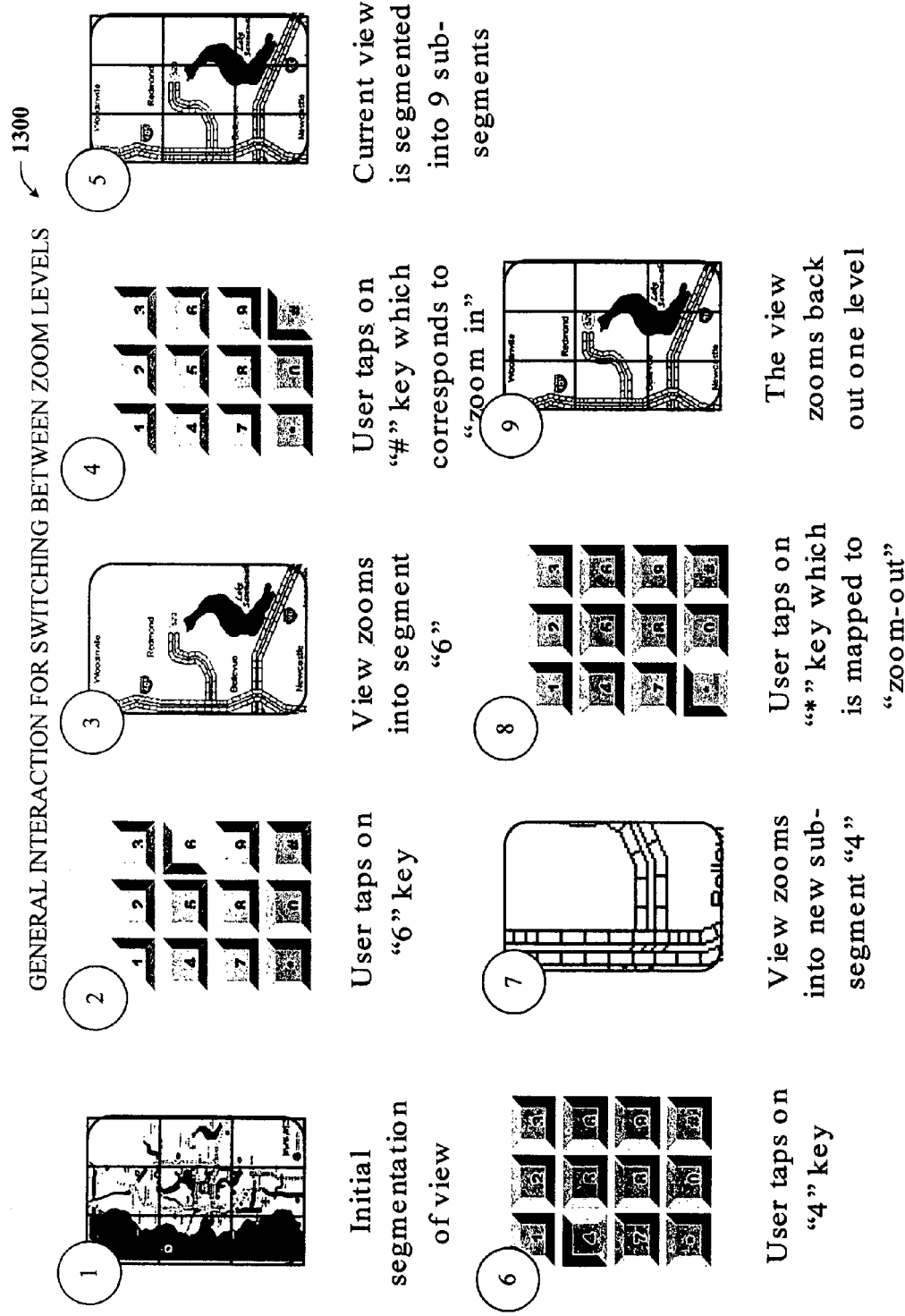
FIG. 13 illustrates an exemplary depiction of navigating through content in accordance with an aspect of the present invention.

In FIG. 13, a general interaction scheme 1300 for switching between zoom levels is depicted. As shown, when a user selects a hardware or software button that corresponds to a particular sub-view-segment, the view is zoomed (with animation) such that the sub-view-segment now fills the display area. The sub-view-segment is then in turn divided into the same number of sub-view-segments, as illustrated in the figure. Further selection via pre-assigned buttons, again causes the view to zoom in or switch between particular sub-views. To zoom out to a previous level, a dedicated zoom-out or "back" button is used.

Figure 14:
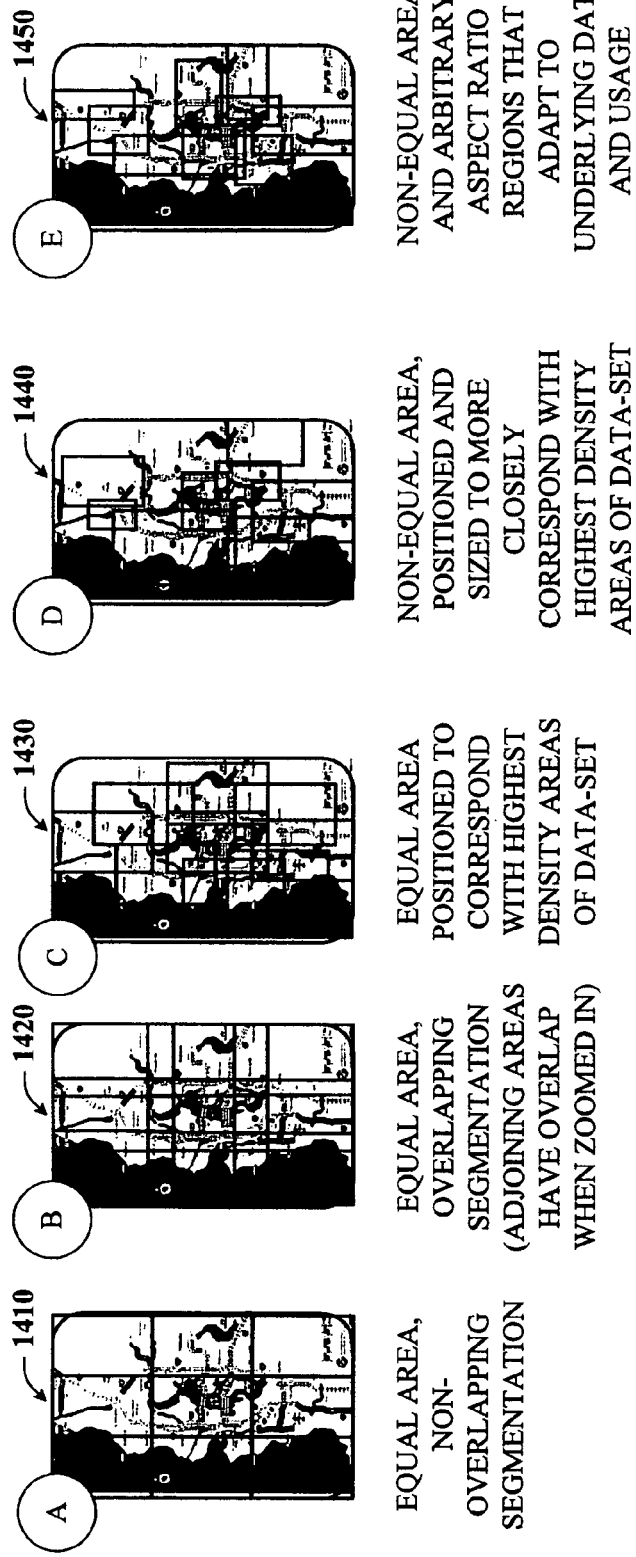
FIG. 14 illustrates exemplary forms for segmenting content in accordance with an aspect of the present invention.

Turning now to FIG. 14, different types of segmentation are demonstrated. For example, the display screen and/or the content located thereon, can be divided into equal area, non-overlapping segments (1410); equal area, overlapping segments whereby the adjoining areas have overlap when zoomed in (1420); equal area, positioned to correspond with highest density areas of data-set (1430); non-equal area, positioned and sized to more closely correspond with highest density areas of data-set (1440); and/or non-equal area and arbitrary aspect ratio regions that adapt to underlying data and usage(1450).

Variations on segmentation may include having sub-view-segments that overlap to provide views that share some amount of content; sub-views that are dynamically defined based on the density of data at a given zoom level; and/or sub-views that are defined ahead of time by an application writer such to optimize viewing of non-constant density data. Furthermore, the layout relationship can correspond to the spatial relationship. For example, imagine a user wants to navigate a web page in the manner described herein. The web page does have some structure such an advertisement pane, text pane, etc. Computations could be performed to determine the spatial mapping between sections of a web page and a keypad. For instance, the advertisement section or pane would not be part of the area to map spatially for viewing.

Though not shown in the figures, a touch sensor could be superimposed or overlaid on the screen and/or content whereby segment or sub-segment labels (e.g., numbers) fade in and out of the screen when a user selection is available. Furthermore one or more buttons on an exemplary keypad or touch sensor screen can be programmed to toggle between a full overview and a previous view to provide additional perspective of the content to the user.

Several aspects of the invention have been employed and tested on two different platforms. For prototyping, Macromedia Flash MX on a desktop PC was used. Keystrokes were captured from a peripheral Genovation Programmable 35 Key ControlPad device to more closely approximate the button layout on a smartphone. The resolution of the Flash prototype matched that of our target smartphone platform. The Flash prototype used a high-resolution map of the Puget Sound area of Washington State that showed detail all the way down to the street level. Interaction timing and visual cues were optimized to allow users to quickly find and zoom into a known location on the map.

Simultaneous with development of the Flash prototype, parts of the navigational system and technique were integrated into a road traffic monitoring application for a smartphone. Traffic monitoring is a natural fit for the navigational techniques discussed herein. During a traffic usage scenario, a user needs to be able to quickly compare data at adjacent or nearby areas and rapidly shifting their attention between a detailed view of their current location and an overview that shows overall conditions. In a traditional map navigation application (like the Flash prototype) the design issue is one of how to display more items on the screen than can fit. With respect to traffic monitoring and/or related applications, it is more important for users to be able to quickly navigate between a small set of locations.

Figure 15:
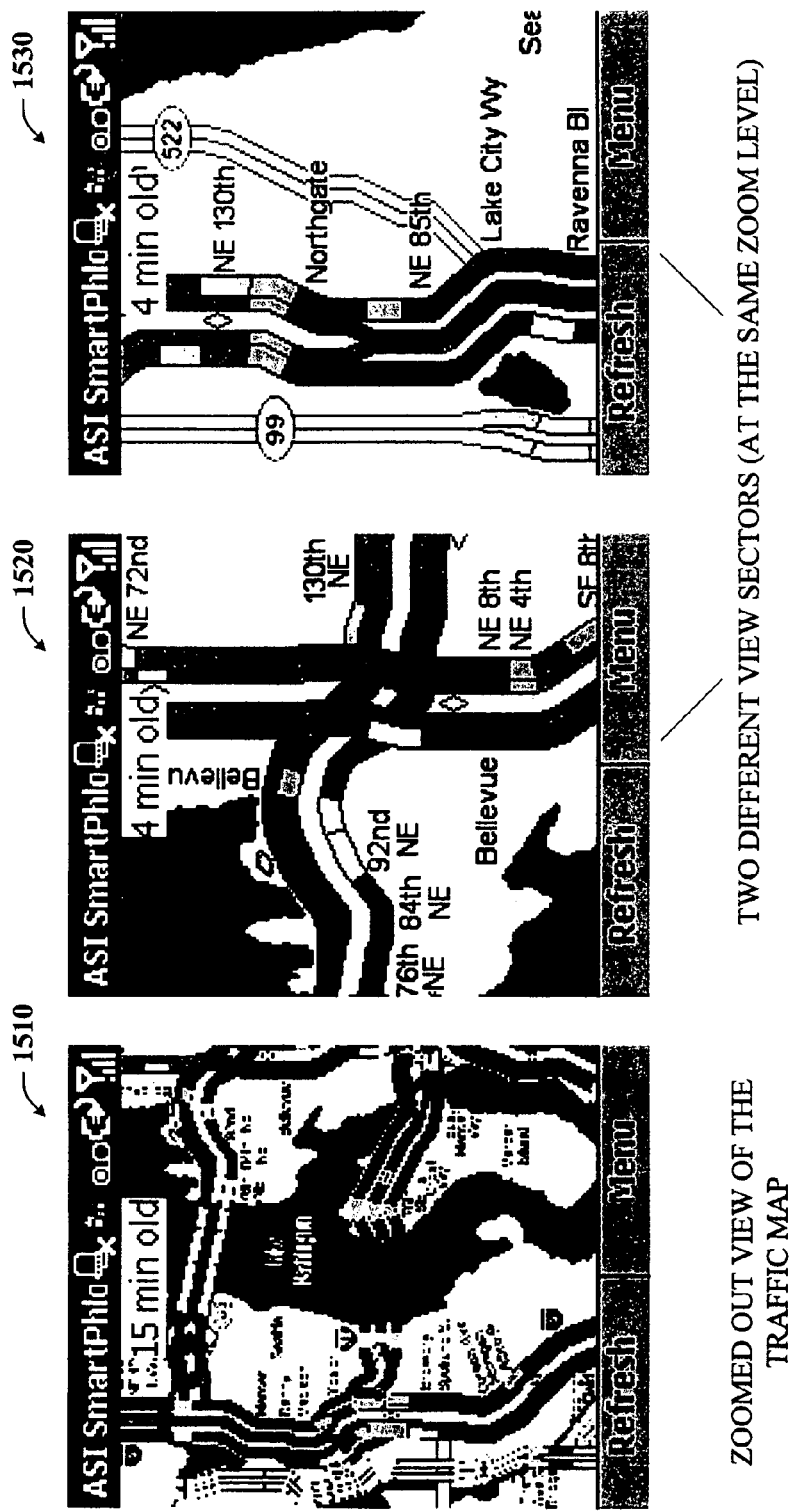
FIG. 15 illustrates an exemplary advanced navigation process during traffic monitoring in accordance with an aspect of the present invention.

The traffic monitoring application was developed using the Microsoft® Smartphone 2002 SDK, however it can be employed in conjunction with other portable devices as well. Simplified maps of the Puget Sound area are shown with sections of major roadways color coded to show current traffic conditions (FIG. 15). The application connects to the Washington State Department of Transportation (WSDOT) traffic server via http over a GPRS or CDMA PCS network. Connection can also be made through a wired internet connection such as when the portable device is docked at a workstation or desktop. The application downloads a relatively small file, usually on the order of about 200 to about 300 bytes, for example, and expands it to populate the colored road segments.

As shown in displays 1510, 1520 and 1530 in FIG. 15, one line of text, overlaid at the top of the display, shows in relative terms ("15 minutes old", "4 minutes old", "one hour old", and etc.) the recentness of the last update. The simplified traffic map depicted in FIG. 15 uses the following color coding scheme (borrowed from the WSDOT web site): green means no traffic, yellow is getting heavier, red is very heavy, and black is stop-and-go. Cells which are white do not have sensors currently associated with them. An assumption can be made that the user base typically has extensive experience with the web-based version of these maps so color-scheme interpretation is very quick. In one version, the left soft-key is dedicated to refreshing the data and the right soft-key brings up a menu with additional options, such as auto-download and choice of map. However, other operations can be associated with the left and/or right soft keys. The animation runs in a separate thread so that the user can choose to view another sector even before the current navigation animation finishes.

In one particular traffic monitoring application, only two levels of zoom are provided. The action button (e.g., usually the center of the d-pad on smartphones) is used to toggle between the two levels of zoom while pressing on different keys on the number pad moves the view among the nine sub-sectors. All the view shift animations are interpolated such that midway through the animation both the source (extents of the current view) and the destination (extents of the next view) can be simultaneously seen (e.g., FIG. 4, supra).

Various aspects of the present invention facilitate traffic monitoring because the invention's concern for regions in space (rather than points in space) allows for coarser grain interaction. The coarse action of selecting from a limited set of view choices works well in situations with only limited user attention common to smartphone, or in general to small portable device, usage.

Though not depicted in FIG. 15, it should be appreciated that navigating through information can include the notion of indicating a path and then having a sequence which flies over a whole predefined path (or route in the case of a traffic pattern or map). That is, consider a fluid animation for each execution, where the file is updated; then the user is shown the current starting point, per default; then the display zooms out to show all, before diving down to center on the route initiation point, and follows the route (e.g., my route between work and home), and then zooms back up again and then back to the default view.

In addition, users may have the ability to input their own personal routes. During common usage, for example, the screen display can either automatically or manually sequence between waypoints on the user's personal route. For manual waypoint selection, the user could either use "next" and "previous" buttons or assign particular waypoints to particular number keys. These waypoints could also themselves be hand-authored view sectors, thus encoding both zoom factor and map position.

To support a broader array of map-based applications, intelligent ways of pre-fetching map data can be employed. For example, in one approach, there can be a small number of navigation view choices available to the user at any given time. Thus, the device may only need to pre-fetch simplified versions of eight adjacent views, for example. Likewise, changes in view for each user interaction in at least one aspect of the present invention can be larger than those with d-pad interaction. Because of this, there theoretically might be more time between user input in which to engage and take advantage of adaptive refinement of the viewable region. In another approach, a map that has a fixed representation is zoomed in and out according to one aspect of the subject invention. For example, imagine that the traffic map source (e.g., WSDOT) provides users with several predefined maps. This aspect of the invention lets the user select among these maps. However, it should be understood that a method of semantic zooming for the map and/or its overlaid traffic data can be employed so that it is not necessary to rely on such carefully hand-authored maps.

Other interesting variants of navigating in map-based applications (such as traffic monitoring) include automatically going fast over the green, but automatically slowing down over the non-green; and automatically slowing down when colors are changing, thus, going slowest when there is maximal color change per inch. Auto-zoom to zoom transitions can also be based on complexity in a region (or consider maximal complexity on the whole path for choosing a constant zoom for the flyover).

Moreover, an approach to automating animations for automatic flyovers can be generalized: Zoom in tighter and/or flying over regions of paths, acreage, and real-estate more slowly as the resolution dictates and as the complexity goes up—for any application.

Turning now to FIGS. 16-24, a navigational sequence using a pointing device on a small portable device is shown, wherein each figure represents a phase in the sequence. Looking initially at FIG. 16, there is illustrated an image of a portable device 1600 displaying a portion of a map 1610 on its screen. In general, as the speed of a pointing device increases, less detail (e.g., more of an overview) of the underlying content appears on the screen. However, at slower speeds, more detail of the underlying content is displayed. Transitions between views of the content are smooth and fluid-like rather than abrupt zoom-in and out changes.

Figure 17:
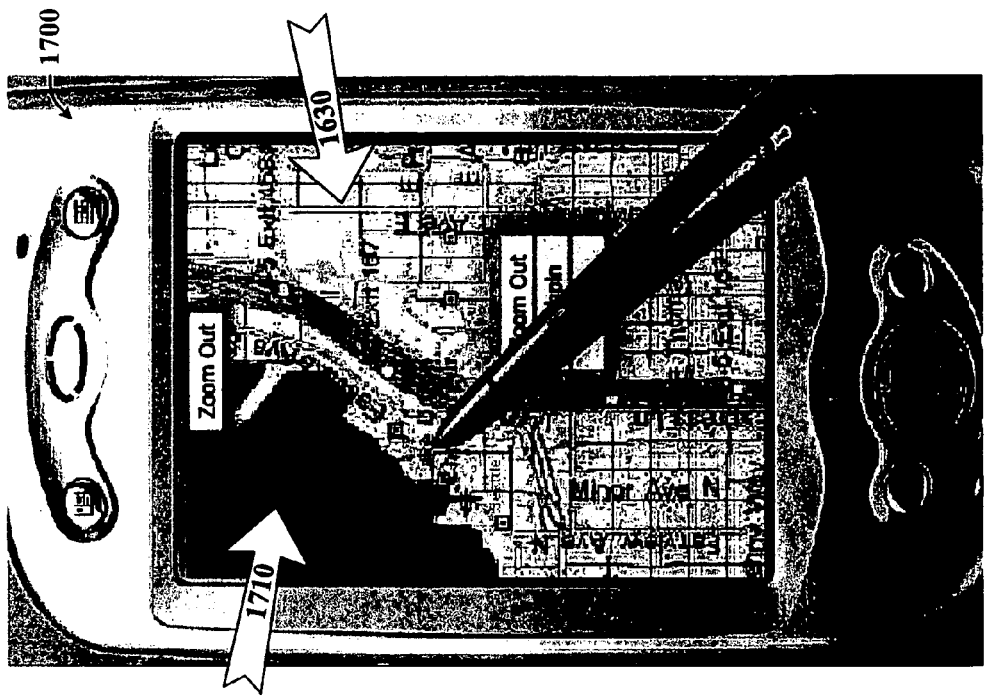
FIG. 17 illustrates an exemplary advanced navigation process on portable devices in accordance with an aspect of the present invention.
Figure 16:
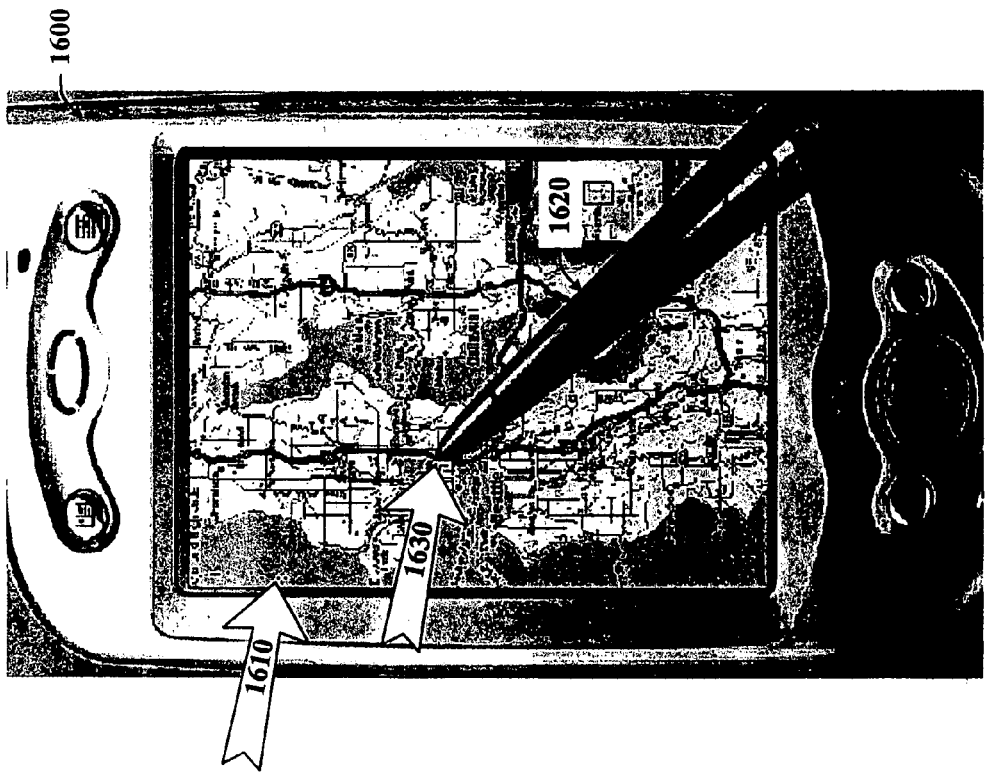
FIG. 16 illustrates an exemplary advanced navigation process on portable devices in accordance with an aspect of the present invention.
Figure 19:
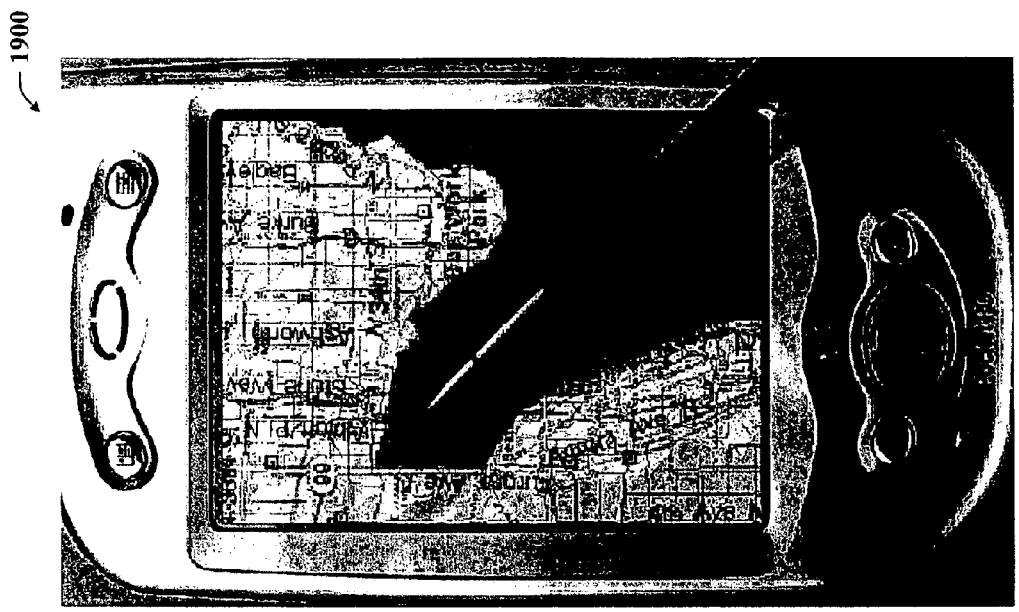
FIG. 19 illustrates an exemplary advanced navigation process on portable devices in accordance with an aspect of the present invention.
Figure 18:
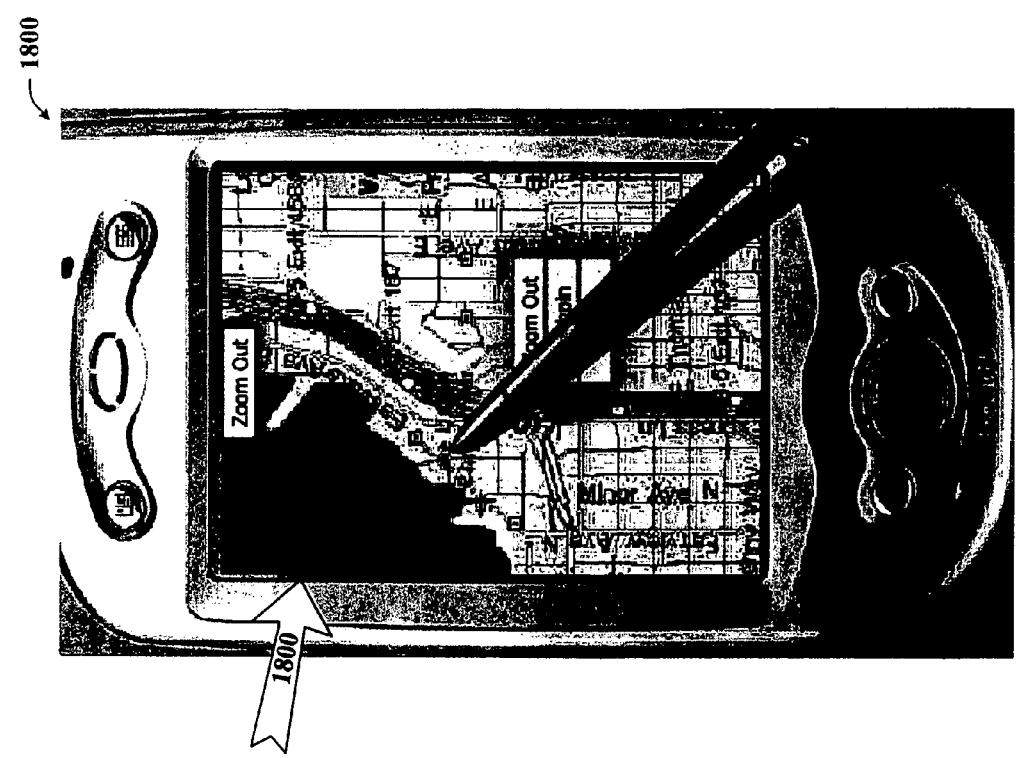
FIG. 18 illustrates an exemplary advanced navigation process on portable devices in accordance with an aspect of the present invention.

Furthermore, when the stylus is pressed down on the screen, that portion of the screen is zoomed in, as shown in FIGS. 16 and 17. For instance, in FIG. 16, a stylus 1620 presses on a region 1630 of the map in FIG. 16, and the resulting zoomed in view of region 1630 is shown in FIG. 17. However, it is important to note that a semi-transparent overview 1710 of the content can still be seen overlaying the zoomed-in region 1630. The overlay of the semi-transparent overview can appear as the stylus 1620 is more slowly dragged across the screen (e.g., while zooming in to various regions of the map), thereby creating a ghosting effect of the overview. However, once fully zoomed in to the region 1630, the overlay can disappear, as indicated a display screen 1800 in FIG. 18.

Figure 20:
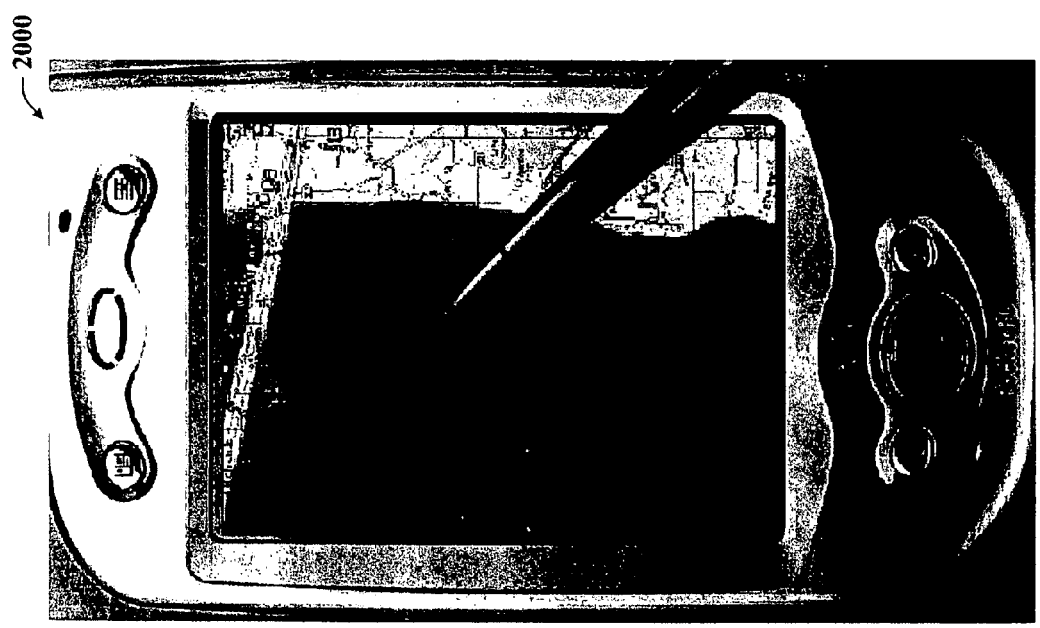
FIG. 20 illustrates an exemplary advanced navigation process on portable devices in accordance with an aspect of the present invention.

In addition, when viewing a zoomed in level of content (e.g., stylus is pressed on a particular location of the underlying content), options such as "zoom out", "pushpin" (to mark a location), and/or "info" can appear for user selection. However, when the user resumes dragging the stylus along the content, the options can fade away as shown in display screen 1900 in FIG. 19. The screen displays depicted in FIGS. 19-22 are essentially still screenshots of the stylus moving across the map at varying speeds. In particular, FIG. 20 shows more of an overview and less detail of this portion of the map, therefore it can be inferred that the stylus is moving relatively fast over the area.

Figure 21:
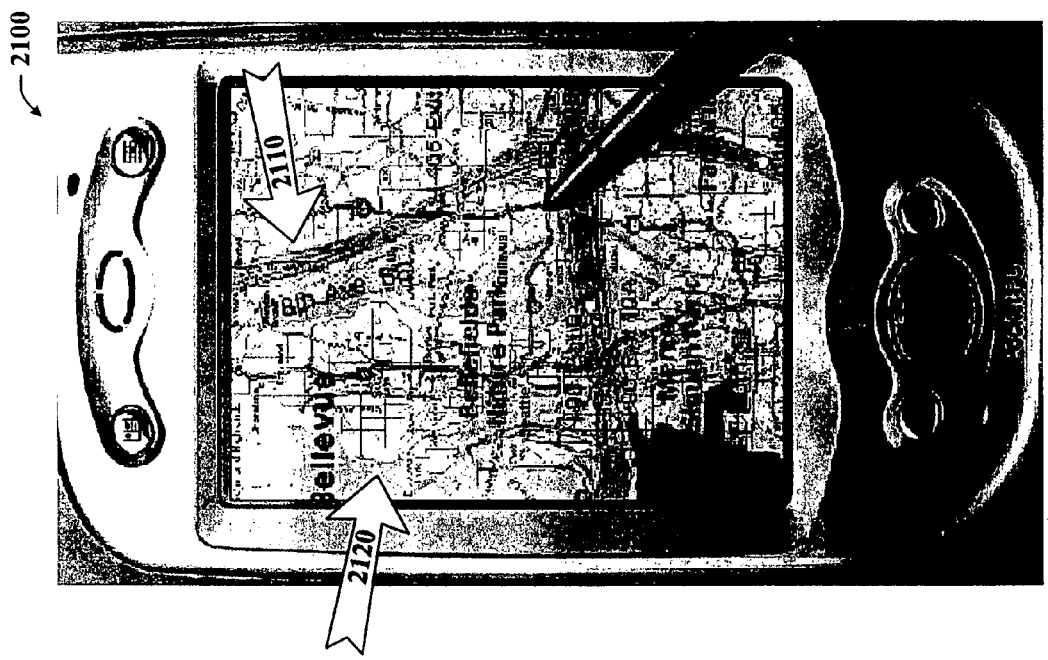
FIG. 21 illustrates an exemplary advanced navigation process on portable devices in accordance with an aspect of the present invention.

Conversely, the stylus shown in FIG. 21 appears to be zooming in to reveal more detail 2110 and at the same, a semitransparent overlay 2120 of the overview of that area and surrounding areas is displayed as well. Hence, it can be inferred that the stylus is moving at a slower speed than indicated in FIG. 20. Moreover, the overlay provides perspective to the user and can be useful in orienting the user with regard to his current location, for example.

Figure 23:
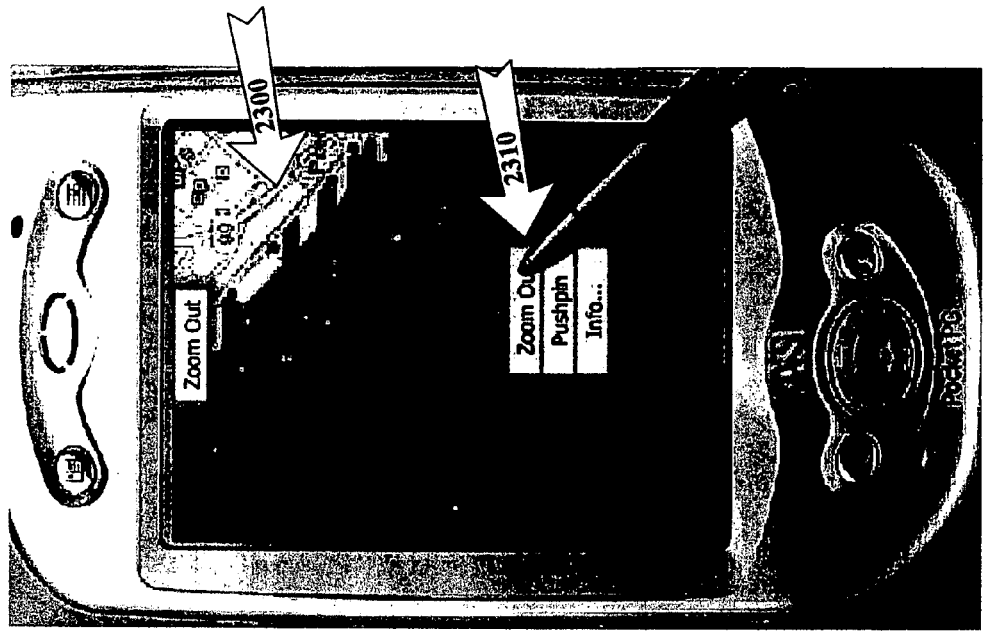
FIG. 23 illustrates an exemplary advanced navigation process on portable devices in accordance with an aspect of the present invention.
Figure 22:
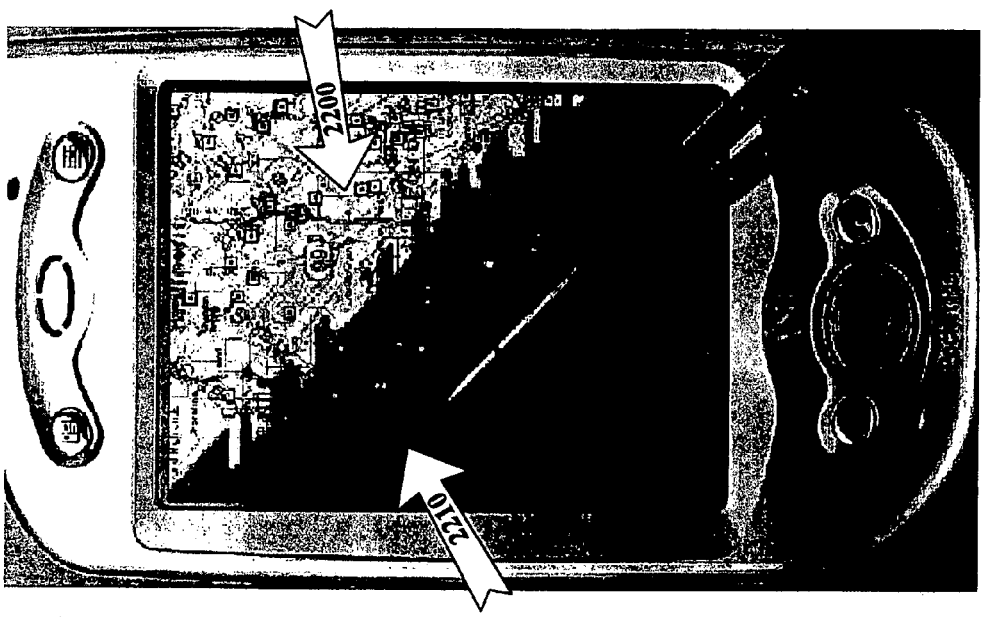
FIG. 22 illustrates an exemplary advanced navigation process on portable devices in accordance with an aspect of the present invention.
Figure 24:
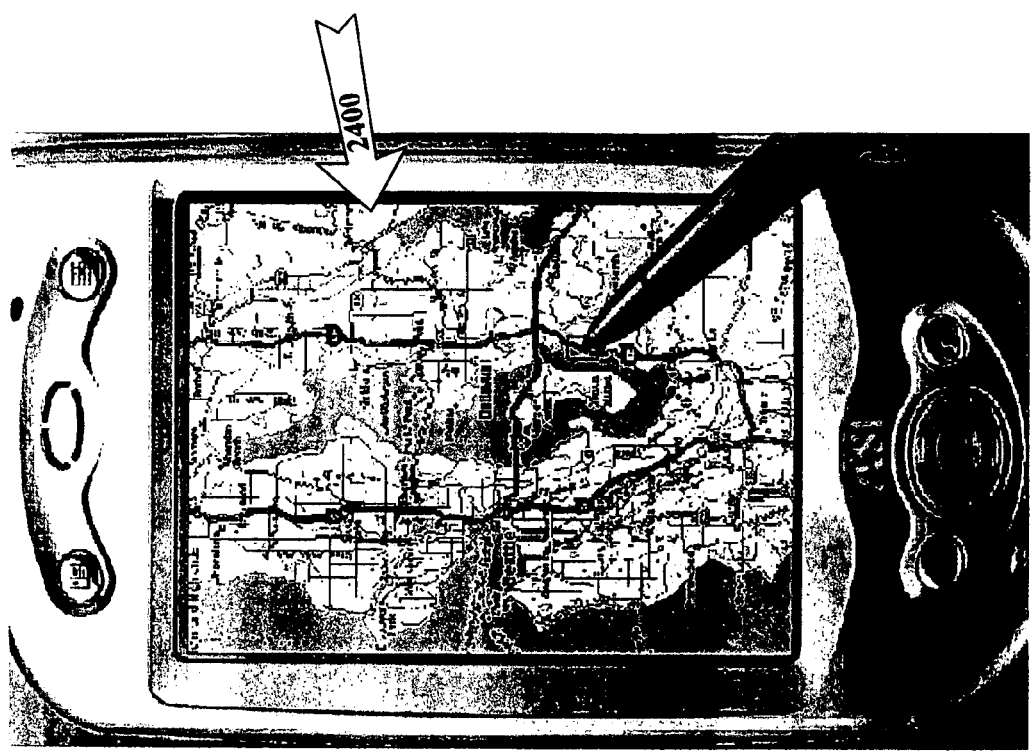
FIG. 24 illustrates an exemplary advanced navigation process on portable devices in accordance with an aspect of the present invention.

In FIGS. 22 and 23, a similar zoom-in 2200 and overlay 2210 (FIG. 22) ending in a zoomed-in view 2300 (FIG. 23) is illustrated. From FIG. 23, the user selects zoom out 2310 and the resulting zoomed out view 2400 is shown in FIG. 24. Of course, other information in addition to maps can be navigated in this manner such as documents, calendars, spreadsheets, pictures, images, traffic patterns, diagrams, and the like.

Moving on to FIGS. 25-28, there is illustrated yet another tool that can be employed to navigate through two-dimensional information space in accordance with an aspect of the present invention. In particular, the figures demonstrate using a speed-sensing lens to view portions of displayed information in more detailed or in a magnified state without altering other portions of the display screen or displayed information. The level of magnification and/or detail of content depend at least in part on the speed at which the lens is moved across the content and/or screen.

Figure 25:
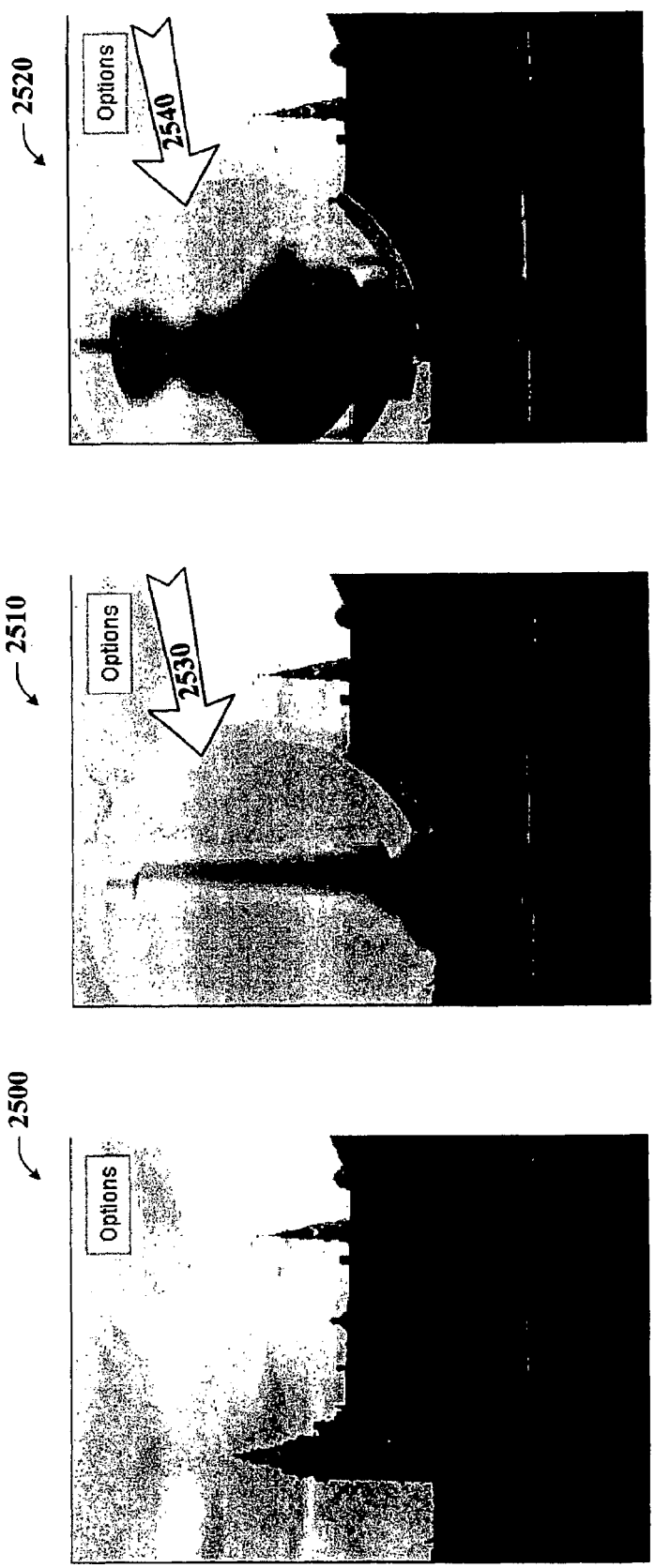
FIG. 25 illustrates an exemplary advanced navigation process on portable devices using a lens component in accordance with an aspect of the present invention.

For instance, FIG. 25 shows three different views (2500, 2510, and 2520) of the same photograph. In the first view 2500, the photograph appears in full view as it would on the display screen. In the second view 2510, a very top portion of the tower is magnified by the lens (2530) to show a greater amount of detail of this part of the tower. In the third view 2520, another portion of the tower can be inspected in greater detail as well by the lens (2540). In both "magnified" views (2510, 2520), only a specific area of the picture is enlarged for greater detail and more precise viewing; whereas, the remaining areas of the photograph are preserved and remain unaffected by the lens and/or its zooming effect. Thus, specific or desirable regions of content can be effectively zoomed in without substantially or materially affecting the remaining regions of the content. This can be advantageous for users who want to maintain full view of the content but who still desire to see more detail about some aspect of the content.

Figure 27:
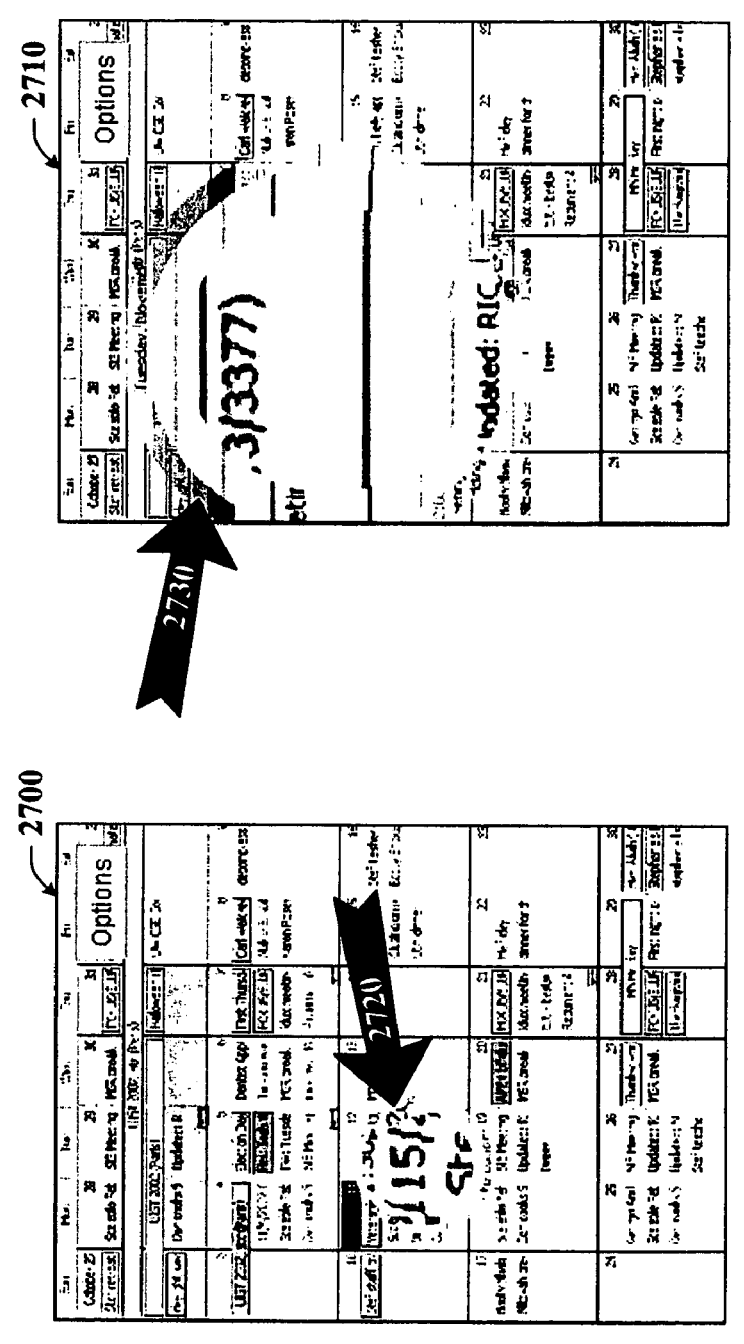

Next, in FIG. 26, a similar application of the speed sensing lens is applied to a calendar application. Again, the same calendar is presented in two different views: 2600 and 2610. View 2600 represents a calendar in full view. View 2610, however, shows a lens 2620 zooming in some specific content 2630. In FIG. 27, a similar calendar having views 2700 and 2710 are also depicted. In the first view 2700, the lens 2720 is shown as being smaller than the lens 2730 in the other view 2710. Thus, less content is revealed through the lens as can be seen in the two views. The size of the lens can depend in part on the speed at which the lens moves across the content. For example, faster movements of the lens may lead to a smaller lens whereas as slower movements may lead to a larger lens.

Finally, FIG. 28 demonstrates using the speed sensing lens in conjunction with navigating a map. Three different views (2800, 2810, and 2820) of the same map are shown, with each view representing different levels of magnification by the lens. For instance, a smaller lens is employed in view 2800 as compared to the areas 2840 and 2850 magnified in views 2810 and 2820, respectively. Furthermore, content in view 2820 enlarged by the lens appears to be in greater detail than area 2840 in view 2810. Again, this can be due to the speed at which the lens was moving, as well as a number of other parameters that can be pre-set or programmed by the user.

Various methodologies in accordance with the subject invention will now be described via a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring now to FIG. 29, there is a flow diagram of an exemplary process 2900 that facilitates navigating through two-dimensional content on a portable device. The process 2900 comprises receiving input such as from a user, for example, at 2910. The input can be given by way of a keyboard, keypad, touch pad, touch sensor, and/or pointing device. Furthermore, the input can relate to what content or portion thereof the user wants to view. For example, the user may want to select a particular area to view in more detail (e.g., zoom in); to view less detail or more of an overview of the content; to glance at a nearby area but maintain the current view, and the like. Thus, at 2920, the view selected based at least in part upon the user's input can be oriented. At 2930, the oriented view can be mapped for a proper fit in the display screen; and then can be displayed on the screen at 2940.

FIG. 30 provides a flow diagram of an exemplary methodology 3000 that facilitates navigation with respect to "segmented" content on a portable device. Initially, an overview of a data-set (e.g., zoomed out or full view of the data-set) can be provided whereby the viewable data-set is segmented at 3010. In particular, the data-set in view on the screen can be segmented using any number of author-, user-, complexity-, and/or content-based parameters or preferences. The segments can be in any type of configuration but for ease of understanding, the data-set are segmented into 9 segments, the 9 segments corresponding to the top three rows of keys on a keypad of a portable device (e.g., cell-phone). As other portions of the data-set come into view, they can be dynamically segmented as well.

At 3020, a first input is received which causes the orientation of segment M to occur (e.g., M corresponds to any one of the 9 segments). The view of segment M can fill the viewable space of the screen at 3030 to be displayed to the user at 3040. At 3050, a second input can be received. The second input can be, for example, a command to revert the current (zoomed in) view back to the full view (overview) or previous view or original focus of interest. Thus, at 3060, the appropriate view (e.g., full overview, previous view, or original focus of interest) is again displayed.

Referring now to FIG. 31, a flow diagram of another exemplary advanced navigational process 3100 in accordance with an aspect of the present invention is shown. The process 3100 involves providing an overview of a data-set on a display screen at 3110, whereby the data-set has been "segmented" into some number of segments or sub-sectors. The segments can be identified to the user by superimposing segment identifiers over the respective segments. The segment identifiers can correspond to the input component such as number keys on a keypad. However, when the input component is a pointing device such as a stylus, for example, the pointing device can be used to touch a particular segment or area of the display screen, whether the segment is labeled with an identifier or not.

At 3120, a first input is received that may translate to "zoom in segment M", for example. At 3130, the process 3100 orients segment M to substantially fill the display screen. In doing so, the view of the content pans and zooms in to show and display segment M at 3140. At 3150, a second input is received that can translate to "return to previous view", for example. At 3160, the view pans and zooms out to result in the display of the previous view (e.g., full overview of the data-set). Other buttons can be programmed to "show" full overview or the original focus of interest, depending on the functionality or operation associated with the button.

Referring to FIG. 32, a flow diagram of yet another exemplary process 3200 that facilitates navigating through content on small portable devices is illustrated. Initially at 3210, a zoomed in view of a portion of content is displayed on the device screen. At 3220, a button that corresponds to a pre-defined view shift is pressed down and held for a certain amount of time (e.g., 2 seconds). The button can be located on a keypad, keyboard, touchpad, or appear as a touch sensor button on the display screen. At 3230, the view of the portion of the content is shifted temporarily as a result.

At 3240, the button is released after some time (e.g., 2 seconds) to return the view to the previous configuration at 3250.

Turning now to FIG. 33, a flow diagram of an exemplary navigation process 3300 is depicted to demonstrate that a button can provide a different result when tapped (e.g., quickly pressed and released). In particular, a zoomed in view of a portion of content can be displayed on the device screen at 3310. At 3320, a button corresponding to a pre-defined view shift (e.g., up, down, right or left; up one segment, down one segment, right one segment or left one segment) is tapped. As a result, the view is shifted to the new configuration (view) at 3330. This is in contrast to the process 3200 described in FIG. 32, supra. More specifically, the process 3200 facilitates a "glance" feature that allows a user to effectively glance at content that is nearby or neighboring the current view while maintaining its current view to provide additional context or perspective to the user with regard to its current view.

A variation of the process 3300 is described in an exemplary navigation process 3400 as seen in FIG. 34. In the process 3400, an overview of segmented content is displayed on a device screen at 3410. At 3420, a first key is tapped on a keypad, for example, whereby the first key corresponds to a first segment of content. As a result, the process 3400 zooms in to the first segment at 3430 at a first zoom level. At 3440, a second key is tapped, wherein the second key corresponds to a second segment of content. At the current or first zoom level, the view shifts to the second segment at 3450. Thus, content can be viewed at the same or multiple zoom levels which allows for a more fluid browsing experience.

Figure 35:
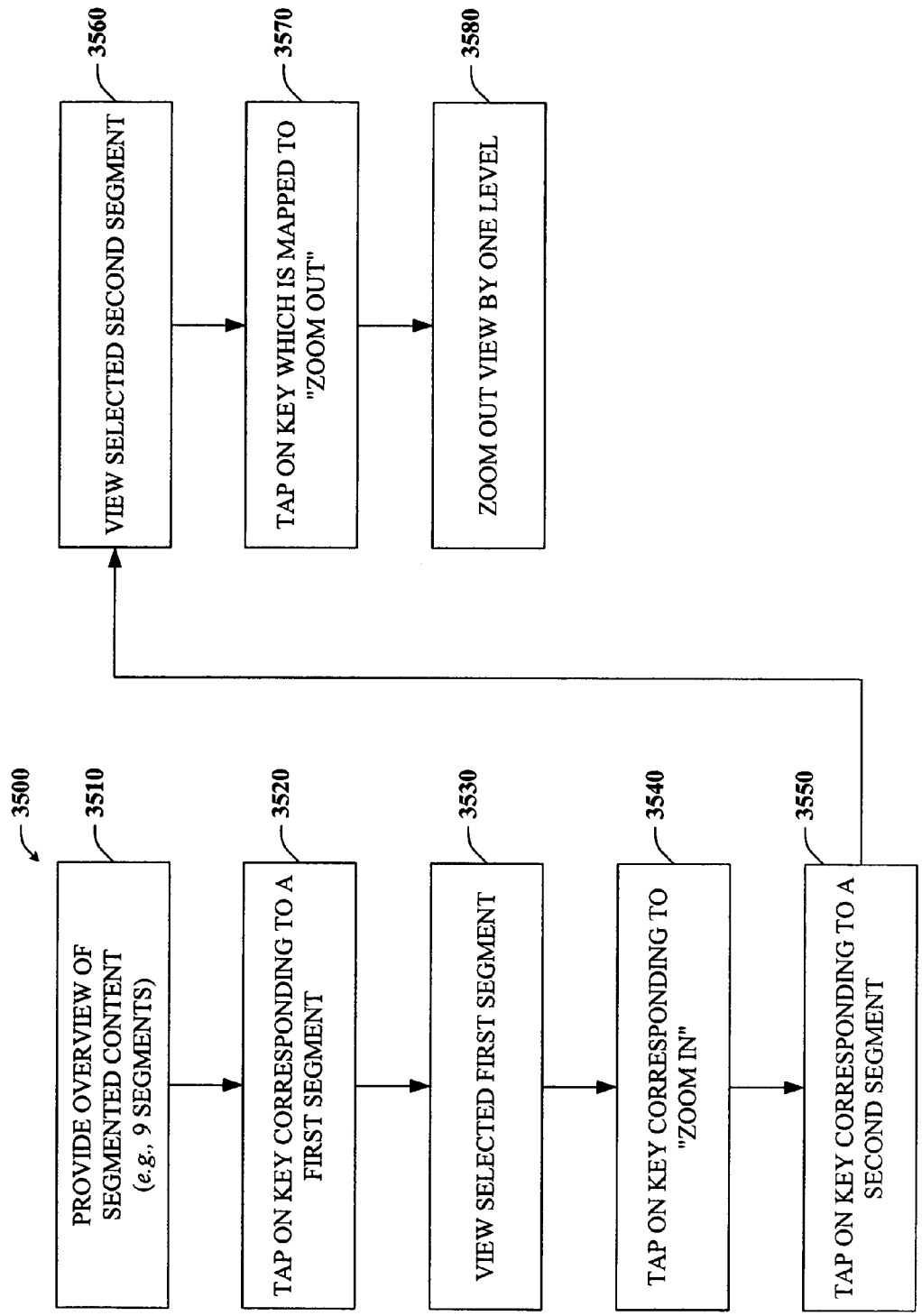
FIG. 35 is a flow diagram of an exemplary advanced navigation process in accordance with an aspect of the present invention.

Moving on to FIG. 35, a flow diagram of an exemplary navigational methodology 3500 in accordance with the present invention is illustrated. In particular, an overview of segmented content is initially displayed on the device screen at 3510. At 3520, a key corresponding to a first segment is tapped to cause the first selected segment to be viewed (by filling the frame of the device screen) at a first zoom level at 3530. At 3540, a key corresponding to a "zoom in" function can be tapped to cause the first segment to be zoomed in at a second zoom level. Thus, the first segment is shown in even greater detail on the device screen. At the second zoom level of the first segment, the content displayed in the device screen can be further segmented into any number of sub-sectors or segments. At 3550, a second key corresponding to a second segment (e.g., any one of the segments displayed at the second zoom level) is tapped and the selected segment is displayed to substantially fill the frame of the screen at 3560. At 3570, a key mapped to a "zoom out" function can be tapped to zoom out the view by one level at 3580. Thus, the second segment is displayed at the first zoom level.

Although not explicitly stated, the processes discussed in FIGS. 28-35, supra, can be repeated any number of times to facilitate a user's smooth and relatively effortless navigation through content viewed on small portable devices such as PDAs, cell-phones, and the like. Furthermore, any input received as indicated in the above processes can be adapted to be made via any input component such as a pointing device and touch screen in addition to keys on a keypad. However, when utilizing a pointing device to navigate through the content, additional and/or alternative features are available in conjunction with the pointing device to improve navigation of the content.

Figure 36:
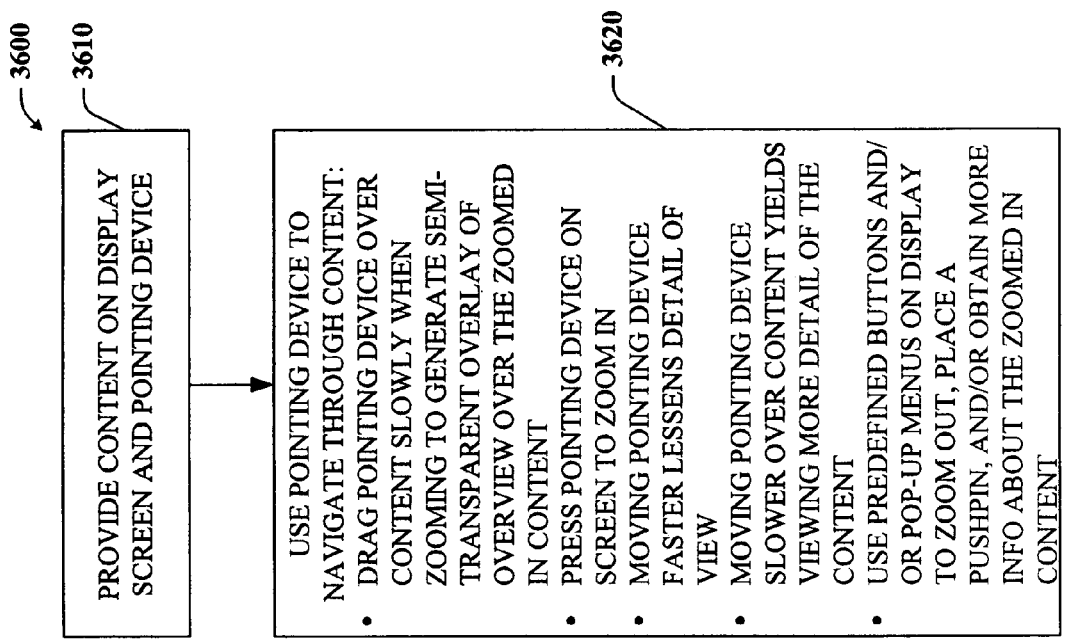
FIG. 36 is a flow diagram of an exemplary advanced navigation process in accordance with an aspect of the present invention.

FIG. 36 demonstrates a flow diagram of an exemplary process 3600 that involves employing a pointing device as the input component. Initially, any type of content can be displayed in full view (overview) or at any zoom level on a device screen at 3610. At 3620, the pointing device can be used to navigate through the content by contacting the surface of the device screen at 3620. For example, when the pointing device is dragged across or over the content on the screen at a relatively slow speed, the content can be gradually but smoothly zoomed in. When zooming in on the content, a semi-transparent overview of the content can fade in as an overlay over the zoomed in content. This provides context and/or perspective to the user as the user zooms in to some portion of the content. When the zoom in operation is substantially completed and/or when a user lifts the pointing device off of the screen, the semi-transparent overview can fade out and disappear, leaving the zoomed in view of the content.

Furthermore, when pressing and holding the pointing device on an area of the screen, the corresponding underlying content can be zoomed in. In addition, as the pointing device moves faster over the screen, less detail of the content is in view; whereas, when moving slower across the screen, more detail of the content is in view. Drop-down menus as well as other on-screen buttons can be utilized by the pointing device to perform such manipulations or navigation of the content such as zoom out view, place a pushpin at the location of the pointing device, and/or obtain more information regarding the zoomed in content or the focus of interest at the location of the pointing device.

As discussed hereinabove, systems and techniques for easy and fast navigation of two-dimensional information spaces on small portable devices have been presented. In particular, the information space can be divided up into nested sub-segments, each of which is accessible via a number key-pad, for example. Unlike typical ZUIs, the user does not have to engage in precise view manipulation. In addition, the present invention can be especially useful in scenarios such as traffic monitoring, where a user needs to easily compare nearby areas on a map. Various visual cues, such as a schematic overview, numeric feedback, and gradated border from a parent view can also be used to reinforce the location of the current view. Although not previously discussed, the present invention can also include the ability to customize the view segmentation and feature selection.

Much of the invention has been described in relation to map-based applications, though it should be appreciated that other applications and/or content can be viewed and navigated in a similar manner. However, maps exhibit many of the same properties as other information spaces: they are continuous, have a heterogeneous distribution of interesting data, possess multiple levels of detail, and usually have a highly variant visual representation. Because of this, the applicability of the systems and techniques can be extended to other kinds of information spaces such as web pages, spreadsheets, and image browsing. As mentioned above, overview cues (e.g., semi-transparent numbers superimposed on each sector to assist users in associating a particular key with the appropriate sector) are of limited utility when a user navigates between more than two levels of zoom. Thus, cues that scale well for indicating the level and position of the current view can be employed.

Artificial intelligence schemes can also be utilized in various aspects of the present invention to facilitate predicting and/or learning user behavior. In the simplest cases, when a user is only navigating between two levels of zoom, a particular number key is only mapped to a particular view sector on the map. In this case, the relationship between a number key and a location is reinforced with more usage.

Likewise, with standard d-pad based panning, clicking on the left button always moves the view right. That makes the use of the d-pad predictable and repeatable. However, during multi-level zoom, a given number key shifts the view in different ways depending on the current state. Because of this, it may not be possible to encode any of the user's actions into procedural memory. Therefore, a user must interrogate the current view configuration for a variety of cues to understand how a particular key will change the current view. The zoom level, whether the view is focused on a parent or child view, and the current sector (if zoomed in) can affect what a particular key will do next.

Finally, the present invention can also employ recovery techniques to help users recover from accidentally hitting the wrong key. For example, one or more cues can be provided so that a user can very easily determine if the view has shifted in the desired way. If the view is incorrect, a quick and intuitive means to shift the view in the intended way can be provided.

Figure 37:
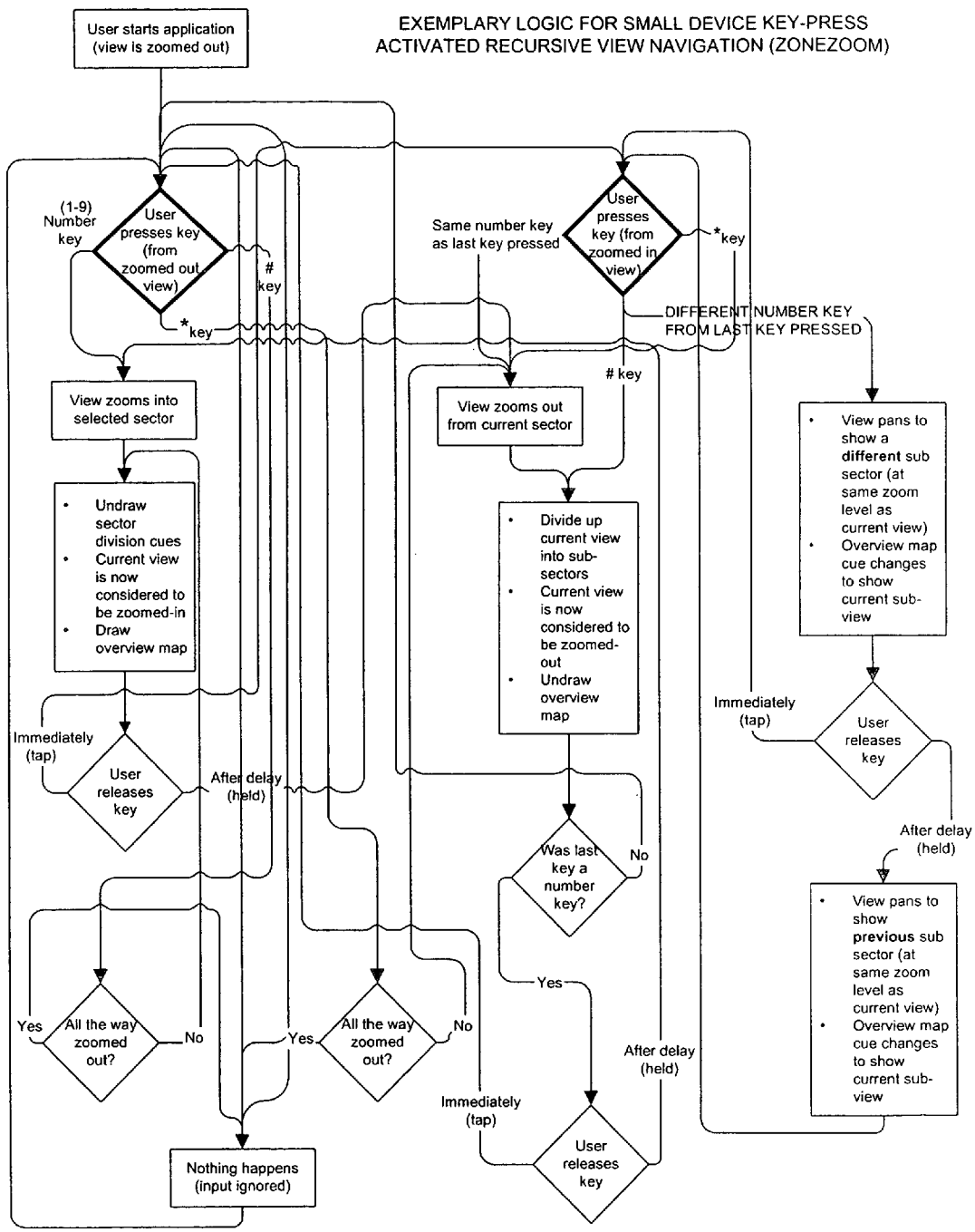
FIG. 37 illustrates an exemplary flow chart of a typical logic for small, portable device key-press activated recursive view navigation in accordance with an aspect of the present invention.

Turning now to FIG. 37, there is illustrated an exemplary logic diagram for small, portable device key-press activated recursive view navigation as described hereinabove. As can be seen from the diagram, navigating through content by way of panning in and/or out, zooming into a sector (e.g., one out of 9 sectors), dividing up that view of the content again into another 9 sectors, and then zooming in on one of those 9 sectors, as well as zooming out from a zoomed in view is facilitated by using the numeric and non-numeric keys of a keypad. Furthermore, when particular keys are pressed and held for a time rather than simply tapped, additional views of the content or at least a portion thereof are available. Moreover, a user can create and/or maintain a mental model or visualization of a greater portion of the content rather than simply what is in view at a given time.

Figure 38:
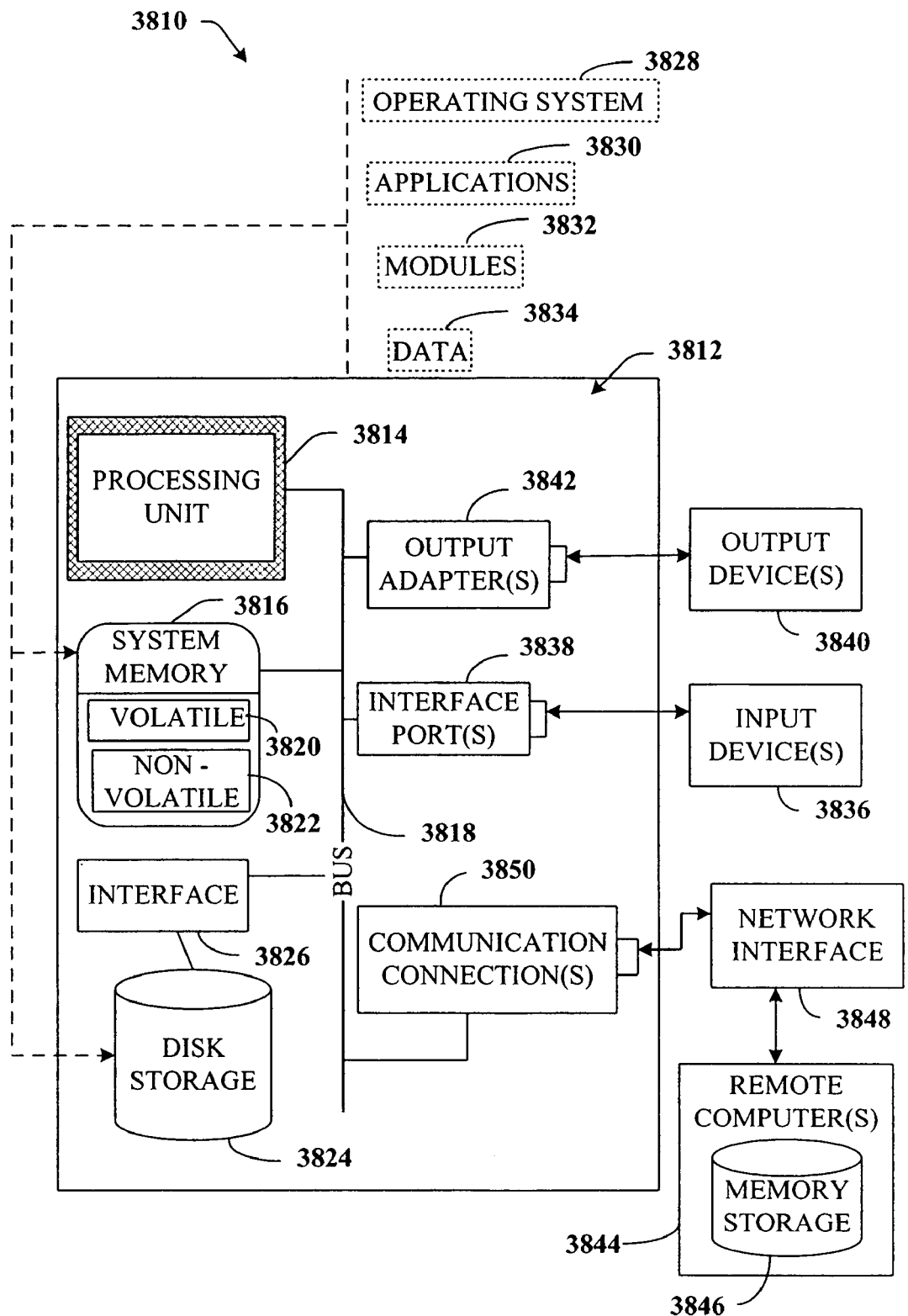
FIG. 38 illustrates an exemplary environment for implementing various aspects of the invention.

In order to provide additional context for various aspects of the present invention, FIG. 38 and the following discussion are intended to provide a brief, general description of a suitable operating environment 3810 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 3810 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 38, an exemplary environment 3810 for implementing various aspects of the invention includes a computer 3812. The computer 3812 includes a processing unit 3814, a system memory 3816, and a system bus 3818. The system bus 3818 couples system components including, but not limited to, the system memory 3816 to the processing unit 3814. The processing unit 3814 can be any of various available processors. Dual microprocessors and other multiprocessor architectures also can be employed as the processing unit 3814.

The system bus 3818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 3816 includes volatile memory 3820 and nonvolatile memory 3822. The basic input/output system (BIOS), containing the basic routines to transfer information between elements within the computer 3812, such as during start-up, is stored in nonvolatile memory 3822. By way of illustration, and not limitation, nonvolatile memory 3822 can include read only memory (ROM), programmable ROM (PROM), electrically programmable ROM (EPROM), electrically erasable ROM (EEPROM), or flash memory. Volatile memory 3820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 3812 also includes removable/nonremovable, volatile/nonvolatile computer storage media. FIG. 38 illustrates, for example a disk storage 3824. Disk storage 3824 includes, but is not limited to, devices like a magnetic disk drive, floppy disk drive, tape drive, Jaz drive, Zip drive, LS-100 drive, flash memory card, or memory stick. In addition, disk storage 3824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 3824 to the system bus 3818, a removable or non-removable interface is typically used such as interface 3826.

It is to be appreciated that FIG. 38 describes software that acts as an intermediary between users and the basic computer resources described in suitable operating environment 3810. Such software includes an operating system 3828. Operating system 3828, which can be stored on disk storage 3824, acts to control and allocate resources of the computer system 3812. System applications 3830 take advantage of the management of resources by operating system 3828 through program modules 3832 and program data 3834 stored either in system memory 3816 or on disk storage 3824. It is to be appreciated that the present invention can be implemented with various operating systems or combinations of operating systems.

A user enters commands or information into the computer 3812 through input device(s) 3836. Input devices 3836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 3814 through the system bus 3818 via interface port(s) 3838. Interface port(s) 3838 include, for example, a serial port, a parallel port, a game port, and a universal serial bus (USB). Output device(s) 3840 use some of the same type of ports as input device(s) 3836. Thus, for example, a USB port may be used to provide input to computer 3812, and to output information from computer 3812 to an output device 3840. Output adapter 3842 is provided to illustrate that there are some output devices 3840 like monitors, speakers, and printers among other output devices 3840 that require special adapters. The output adapters 3842 include, by way of illustration and not limitation, video and sound cards that provide a means of connection between the output device 3840 and the system bus 3818. It should be noted that other devices and/or systems of devices provide both input and output capabilities such as remote computer(s) 3844.

Computer 3812 can operate in a networked environment using logical connections to one or more remote computers, such as remote computer(s) 3844. The remote computer(s) 3844 can be a personal computer, a server, a router, a network PC, a workstation, a microprocessor based appliance, a peer device or other common network node and the like, and typically includes many or all of the elements described relative to computer 3812. For purposes of brevity, only a memory storage device 3846 is illustrated with remote computer(s) 3844. Remote computer(s) 3844 is logically connected to computer 3812 through a network interface 3848 and then physically connected via communication connection 3850. Network interface 3848 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 3850 refers to the hardware/software employed to connect the network interface 3848 to the bus 3818. While communication connection 3850 is shown for illustrative clarity inside computer 3812, it can also be external to computer 3812. The hardware/software necessary for connection to the network interface 3848 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An advanced navigation system for portable devices comprising:
    an input component that receives user input, the input component comprising a pointing device;
    a navigation component that facilitates navigating through content displayed on a portable device screen based in part on speed and location of the input component with respect to the content displayed on the portable device screen;
    a speed-sensing lens integrated into the device screen that is maneuvered over the content by the input component, the speed-sensing lens provides an enlarged or zoomed in view of content underlying the speed-sensing lens but does not substantially affect a view of other surrounding content displayed on the device screen, the enlarged or zoomed in view of the content underlying the speed-sensing lens is provided based on a level of detail and magnification that is continuously adjusted based on the speed of the input component with respect to the content displayed on the portable device screen; and
    a mapping component that smoothly transitions a current view of content underlying the speed-sensing lens to a new or previous view and orients the content underlying the speed-sensing lens or the view thereof based in part on data received from the navigation component.

2. The system of claim 1, the current view comprising any one of an overview of the content underlying the speed-sensing lens, a zoomed in view of the content underlying the speed-sensing lens, and a zoomed out view of the content underlying the speed-sensing lens.

3. The system of claim 2, the mapping component overlays a semi-transparent overview of the content underlying the speed-sensing lens over at least a partially zoomed in view of the content underlying the speed-sensing lens to maintain or provide context and/or perspective of the content while transitioning from a current overview of the content underlying the speed-sensing lens to the zoomed in view of the content underlying the speed-sensing lens.

4. The system of claim 1, the pointing device comprises one or more of a stylus, a pen, a joystick, and a mouse.

5. The system of claim 1, the mapping component displays a less detailed view of the content underlying a faster-moving pointing device.

6. The system of claim 1, the mapping component displays a more detailed view of the content underlying a slower-moving pointing device.

7. The system of claim 1, the portable device comprising a PDA.

8. The system of claim 1, the content comprising document-based content, image-based content, map-based content, and calendars.

9. A computer-readable medium having stored thereon the components of claim 1, wherein the components are computer executable.

10. The system of claim 1, the mapping component adjusts size of the speed-sensing lens based at least in part on the speed of the input component with respect to the content displayed on the portable device screen.

11. A method that facilitates advanced navigation of content on portable devices comprising:
    dragging a pointing device across content displayed on a portable device screen, the pointing device corresponding to a speed-sensing lens; and
    orienting content underlying the speed-sensing lens based at least in part on speed and location of the pointing device, the orienting includes continuously adjusting a zoom level of the content underlying the speed-sensing lens based at least in part on the speed of the pointing device without substantially affecting a zoom level of other surrounding content displayed on the portable device screen.

12. The method of claim 11, orienting the content underlying the speed-sensing lens in less detail when the speed of the pointing device increases.

13. The method of claim 11, orienting the content underlying the speed-sensing lens in greater detail when the speed of the pointing devices decreases.

14. The method of claim 11, further comprising superimposing a semi-transparent overview of the content displayed on the portable device screen over a more detailed view of some portion of the content displayed on the portable device screen while dragging the pointing device over some portion of the content displayed on the portable device screen.

15. The method of claim 14, the semi-transparent overview of the content displayed depends at least in part upon the location of the pointing device with respect to the content displayed on the portable device screen.

16. The method of claim 14, the semi-transparent overview of the content displayed on the portable device screen is a less-detailed view of the content.

17. The method of claim 11, further comprising segmenting the content displayed on the portable device screen into at least two sub-segments for easier viewing.

18. A system that facilitates advanced navigation of content on portable devices comprising:
   means for dragging a pointing device across content displayed on a portable device screen;
   means for displaying a speed-sensing lens at a position of the pointing device with respect to the content displayed on the portable device screen;
   means for orienting content underlying the speed-sensing lens based at least in part on speed and location of the pointing device; and
   means for continuously altering a magnification and detail level of the content underlying the speed-sensing lens based at least in part on the speed of the pointing device without substantially altering a magnification or detail level of other surrounding content displayed on the portable device screen.

19. The system of claim 18, the means for orienting the content underlying the speed-sensing lens comprises means for orienting the content underlying the speed-sensing lens in less detail when the speed of the pointing device increases.

20. The system of claim 18, the means for orienting the content underlying the speed-sensing lens comprises means for orienting the content underlying the speed-sensing lens in greater detail when the speed of the pointing devices decreases.

21. The system of claim 18, further comprising means for displaying a superimposed semi-transparent overview of the content displayed on the portable device screen over a more detailed view of some portion of the content displayed on the portable device screen based at least in part on the speed of the pointing device.

22. The system of claim 21, the overview of the content displayed on the portable device screen is a less-detailed view of the content.

23. The system of claim 18, further comprising means for altering size of the speed-sensing lens based at least in part on the speed of the pointing device.

24. A data packet adapted to be transmitted between two or more computer processes facilitating providing suggestions to an online user, the data packet comprising:
   information associated with dragging a pointing device across a portable device screen; orienting content within a speed-sensing lens underlying the pointing device based at least in part on speed and location of the pointing device without substantially altering an orientation of content surrounding the speed-sensing lens; and superimposing a semi-transparent overview of the content over a more detailed view of some portion of the content while dragging the pointing device over some portion of the content.

* * * * *